United States Patent [19]
Zook et al.

[11] Patent Number: 5,844,920
[45] Date of Patent: Dec. 1, 1998

[54] THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM

[75] Inventors: Christopher P. Zook, Longmont; Neal Glover; Alan J. Armstrong, both of Broomfield, all of Colo.

[73] Assignee: Cirrus Logic, Inc., Fremont, Calif.

[21] Appl. No.: 745,913

[22] Filed: Nov. 7, 1996

[51] Int. Cl.[6] .......................... G11B 20/10; G11B 20/14; G11B 20/18

[52] U.S. Cl. ........................ 371/40.14; 360/51; 371/40.3; 371/42

[58] Field of Search .................................. 360/48, 51, 53, 360/39; 371/39.1, 40.3, 40.14, 42

[56] References Cited

U.S. PATENT DOCUMENTS

| | | | |
|---|---|---|---|
| 4,622,602 | 11/1986 | Kutaragi | 360/48 |
| 4,945,538 | 7/1990 | Patel | 371/43 |
| 5,109,385 | 4/1992 | Karp et al. | 371/42 |
| 5,175,655 | 12/1992 | Satomura | 360/53 |
| 5,231,545 | 7/1993 | Gold | 360/49 |
| 5,233,482 | 8/1993 | Galbraith et al. | 360/46 |
| 5,278,703 | 1/1994 | Rub et al. | 360/51 |
| 5,321,559 | 6/1994 | Nguyen et al. | 360/46 |
| 5,379,160 | 1/1995 | Otani | 360/49 |
| 5,406,426 | 4/1995 | Culley et al. | 360/51 |
| 5,416,760 | 5/1995 | Masood et al. | 369/47 |
| 5,422,760 | 6/1995 | Abbott et al. | 360/46 |
| 5,446,715 | 8/1995 | Satomura | 369/49 |
| 5,448,571 | 9/1995 | Hong et al. | 370/105.4 |
| 5,466,743 | 11/1995 | Zook | 371/37.1 |
| 5,559,840 | 9/1996 | Melas et al. | 375/355 |
| 5,604,646 | 2/1997 | Yamawaki | 360/53 |
| 5,623,474 | 4/1997 | Oshio et al. | 369/124 |
| 5,701,314 | 12/1997 | Armstrong et al. | 371/40.3 |
| 5,715,110 | 2/1998 | Nishiyama et al. | 360/67 |

OTHER PUBLICATIONS

Hassner, M., et al., "On–The–Fly Error Correction in Data Storage Channels", IEEE Transactions on Magnetics, vol. 31, No. 2, Mar. 1995, pp. 1149–1154.

Practical Error Correction Design For Engineers, Second Edition, Neal Glover and Trent Dudley, pp. 250–269.

Glover, N., *Proposed EDAC Scheme For 5¼ Inch Optical Storage Devices*, 1986, Data Systems Technology, Corp., pp. 1–41.

Cirrus Logic, Data Sheet on "Optical Disk ENDEC/ECC," part No. CL–SM330, pp. 22–36, Apr. 1991.

*Primary Examiner*—Stephen M. Baker
*Attorney, Agent, or Firm*—Howard H. Sheerin; Dan A. Shifrin

[57] ABSTRACT

A magnetic disk storage system is disclosed wherein byte synchronization to sector data is achieved even when noise in the read channel, due for instance to a thermal asperity (TA), corrupts the primary preamble and/or sync mark fields or causes a loss of frequency or phase lock. The data sector format is modified to comprise at least one secondary sync mark in addition to the conventional primary sync mark recorded at the beginning of the data field. In this manner, when the primary sync mark becomes undetectable due to errors, or when byte synchronization is lost, the storage system can still synchronize to the data sector using the secondary sync mark. The secondary sync mark is preferably spaced apart from the primary sync mark with either a gap (no data) or user data inserted inbetween. In the latter embodiment, two methods are employed to recover user data inbetween the primary and secondary sync marks when the primary sync mark is undetectable: on-the-fly erasure pointer error correction, and buffering to facilitate retroactive synchronization. The secondary sync mark may optionally include a secondary preamble to facilitate phase locking to the data when the primary preamble is corrupted by errors. The present invention also provides "split segment" resynchronization for synchronizing a first section of data using a first mark, and retroactively synchronizing a second section of data using a following sync mark when synchronization is lost.

34 Claims, 25 Drawing Sheets

005,844,920

THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM

CROSS-REFERENCE TO RELATED PATENTS AND APPLICATIONS

This patent application is related to other U.S. patents and patent applications. Namely, U.S. patent application Ser. No. 08/341,723 entitled "Decimation DC Offset Control in a Sampled Amplitude Read Channel," and Ser. No. 08/313,491 entitled "Improved Timing Recovery for Synchronous Partial Response Recording," and U.S. Pat. No. 5,446,743 entitled "Coefficient Update Method and Apparatus for Reed-Solomon Decoder," and U.S. Pat. No. 5,467,297 entitled "Finite Field Inversion". The above referenced patents and patent applications are hereby incorporated by reference.

FIELD OF INVENTION

The present invention relates to a phenomenon associated with magneto-resistive (MR) read heads for magnetic disk recording referred to as thermal asperity. In particular, the present invention protects against an inability to synchronize to a data sector when a thermal asperity corrupts the data sector's sync mark, or causes a loss of frequency or phase lock while reading the data sector.

BACKGROUND OF THE INVENTION

Magnetic disk storage devices are commonly used by host computer systems to store large amounts of digital data in a non-volatile manner. Typically, a magnetic disk storage medium spinning within the storage device is partitioned into a number of concentric, radially spaced data tracks, where each data track is further partitioned into a number of data sectors. To write and read data to and from a target data sector on a particular track, a recording head (read/write head) is positioned over the track by an electromechanical servoing mechanism. Then, to write to the track, the data serves to modulate a current in a write coil of the recording head in order to write a sequence of corresponding magnetic flux transitions onto the surface of the disk. To read this recorded data, the recording head again passes over the track and emits an analog read signal comprising a sequence of polarity alternating pulses induced by the magnetic flux transitions. These pulses are then detected and decoded into an estimated data sequence by a read channel and, in the absence of errors, the estimated data sequence matches the recorded data sequence.

Generally speaking, there are two types of read channels for detecting the digital data from the analog read signal. In a first method, known as analog peak detection, an analog peak detector operating in continuous time detects the peaks in the analog read signal. The presence of a peak represents a digital "1" bit and the absence of a peak a digital "0" bit. A timing recovery circuit, also responsive to the analog read signal, aligns the peaks to predetermined bit cell periods to determine the number of "0" bits between "1" bits, thereby determining the detected binary sequence (e.g., "10001101001 . . . ").

In a second method for detecting the digital sequence, known as sampled amplitude recording, the analog read signal is sampled at the baud rate (code bit rate) and the digital data detected from these discrete time sample values. Timing recovery in a sampled amplitude system attempts to synchronize the samples to the baud rate rather than align peaks to bit cell periods as in analog peak detection. Also in sampled amplitude detection, a maximum likelihood (ML) sequence detector, such as a Viterbi detector, compensates for intersymbol interference (ISI) and other channel noise during the detection process by selecting a most likely estimated data sequence from a series of consecutive sample values. This increases the effective signal-to-noise ratio (SNR) and allows for significantly higher data densities (i.e., it increases the disk drive's storage capacity).

Whether the pulses in the analog read signal are detected using a conventional analog pulse detector or a more complex discrete time sequence detector, timing recovery must synchronize both in frequency and phase to the data rate of the target data sector before attempting to read the recorded user data. Frequency locking is normally accomplished by injecting a reference signal into the read channel, where the frequency of the reference signal is approximate to the data rate. Then, to facilitate phase locking to the data rate, timing recovery processes a sequence of bits (referred to as a preamble) recorded at the beginning of each sector prior to the user data in order to phase lock a phase lock loop (PLL). After achieving frequency and phase lock, the read channel must synchronize to the detected data in order to frame operation of an RLL decoder. This is accomplished by detecting a sync mark recorded just prior to the user data field.

The read head used to detect the magnetic flux transitions on the surface of the disk is typically either thin film inductive or magneto-resistive (MR). A thin film read head uses the write coil to detect, inductively, the change in the magnetic flux, thereby generating the corresponding polarity alternating pulses in the analog read signal. In contrast, an MR read head comprises an MR strip element that measures the change in the magnetic flux directly. The resistance of the MR strip is inversely proportional to the strength of the magnetic flux; that is, the resistance of the MR strip will increase as it approaches a magnetic flux transition. When a constant current is passed through the MR strip, the voltage measured across it represents the analog read signal and the corresponding polarity alternating pulses.

One source of channel noise that has been identified by designers of magnetic disk drives is a phenomena known as thermal asperity (TA), a transient in the read signal that appears when a MR read head physically strikes an asperity on the surface of the disk. This can significantly increases the temperature of the MR strip element and, because the resistivity of the MR strip increases with temperature, a TA can cause a significant transient in the analog read signal that decays exponentially.

FIG. 9A illustrates the affect of a TA on the read signal: an instantaneous, substantial increase 250 in its DC offset to a point of saturation 252, and then an exponential decay 254 as the TA's effect dissipates. Consequently, the detected estimated digital data will contain errors from the point the MR strip strikes the asperity 250, continuing until the read signal's DC offset falls within a tolerable operating range 256 for the read channel. Unless steps are taken to detect and directly compensate for a TA, the resulting errors in the detected data sequence must be detected and corrected using redundant symbols of an error correction code (ECC). Further, if a TA occurs at the beginning of a data sector such that the preamble and/or sync mark become so corrupted that accurate detection is not possible, or if the TA occurs within the data sector and causes a loss of frequency or phase lock, then the entire sector may be lost due to an inability to synchronize to the user data.

There is, therefore, a need to compensate for thermal asperities corrupting the timing recovery preamble or sync mark information, or causing a loss of frequency or phase lock, so as to prevent losing an entire data sector due to an inability to achieve or maintain byte synchronization.

SUMMARY OF THE INVENTION

A magnetic disk storage system is disclosed wherein byte synchronization to sector data is achieved even when noise in the read channel, due for instance to a thermal asperity (TA), corrupts the primary preamble and/or sync mark fields or causes a loss of frequency or phase lock. The data sector format is modified to comprise at least one secondary sync mark in addition to the conventional primary sync mark recorded at the beginning of the data field. In this manner, when the primary sync mark becomes undetectable due to errors, or when byte synchronization is lost, the storage system can still synchronize to the data sector using the secondary sync mark. The secondary sync mark is preferably spaced apart from the primary sync mark with either a gap (no data) or user data inserted inbetween. In the latter embodiment, two methods are employed to recover user data inbetween the primary and secondary sync marks when the primary sync mark is undetectable: on-the-fly erasure pointer error correction, and buffering to facilitate retroactive synchronization. The secondary sync mark may optionally include a secondary preamble to facilitate phase locking to the data when the primary preamble is corrupted by errors. The present invention also provides "split segment" resynchronization for synchronizing a first, section of data using a first sync mark, and retroactively synchronizing a second section of data using a following sync mark when synchronization is lost.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

System Overview

Figure 1:
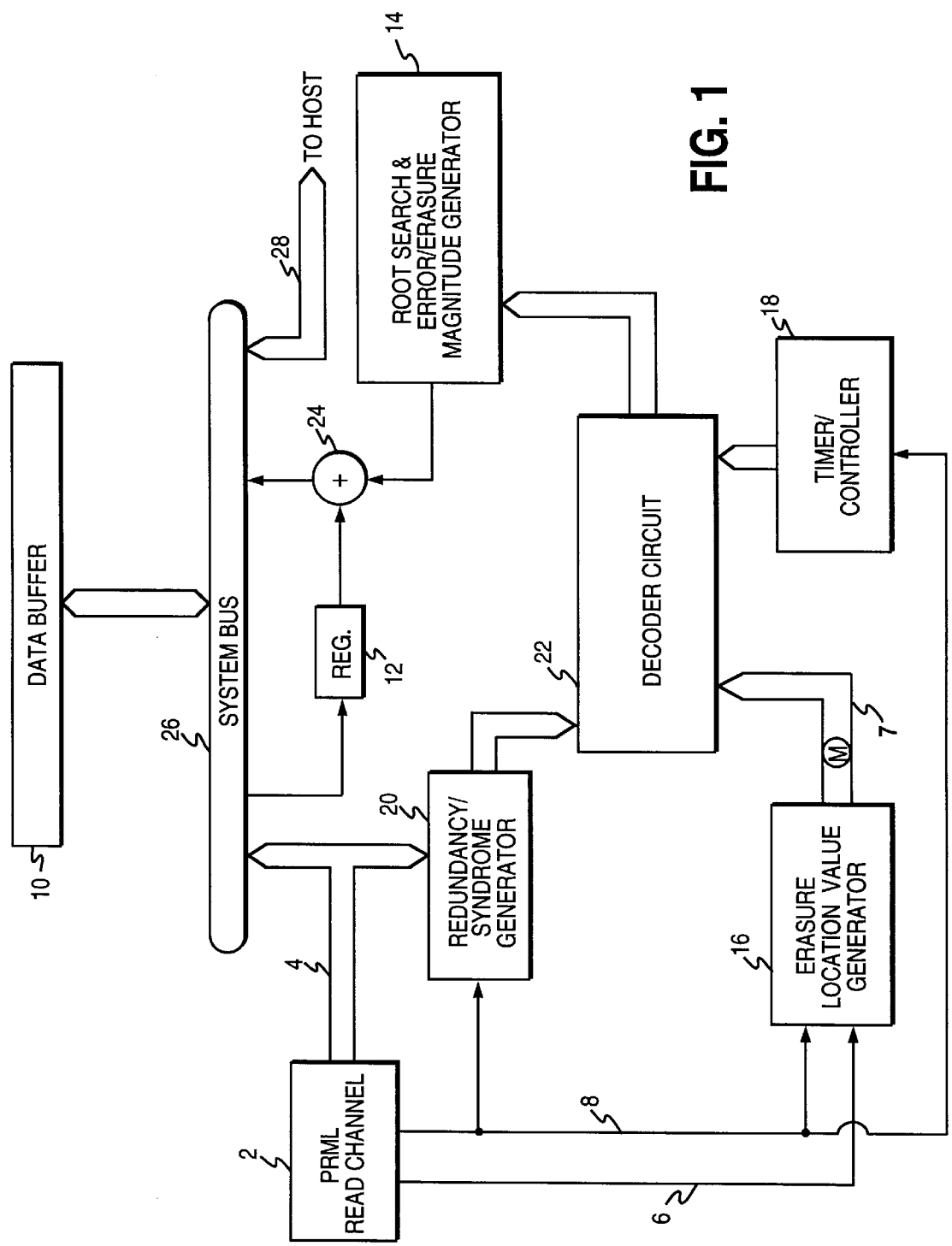
FIG. 1 is a schematic view generally showing a block diagram of the present invention including a sampled amplitude read channel and an error correction system.

FIG. 1 schematically illustrates the magnetic disk storage system according to an embodiment of the present invention. A magnetic disk PRML read channel 2 reads information from a magnetic medium and generates an m-bit data signal on data bus 4, an erasure pointer signal on line 6, and a codeword reset signal on line 8. Other components of the ECC system include a syndrome generator 20; an erasure location value generator 16; a decoder circuit 22; and a root search and error/erasure magnitude generator 14. A timer/controller 18 controls the overall operation of the system by executing the error correction operations described below.

During a write operation, the storage system receives user data from a host system over the system bus 26 and stores the data in a data buffer 10 with a capacity to hold several sectors of data. When the system is ready to write a sector of data to the disk, the timer/controller 18 reads a sector of user data from the data buffer 10 and, as the sector is read from the buffer, the redundancy/syndrome generator 20 generates sector level redundancy bytes 119 (shown in FIG. 3B) which are appended to the sector as it is written to the disk via the PRML read channel 2.

During a read operation a sector of data is read from the disk via the PRML read channel 2 and applied over line 4 to the system bus 26. A sector reset signal on line 8 resets the redundancy/syndrome generator 20, the erasure location value generator 16 and the timer/controller 18 every time a new sector is about to be read from the disk. Then, as the next sector is read, the redundancy/syndrome generator 20 generates error syndromes for use by the decoder circuit 22 and the sector is simultaneously stored in the data buffer 10 for subsequent correction in the event that errors are detected (i.e., non-zero syndromes are generated). As described below, the decoder circuit 22 processes the error syndromes to generate an error location polynomial which is processed by the root search and error/erasure magnitude generator 14 to determine the location and correction values for the errors in the sector. In addition, the decoder circuit 22 may utilize erasure pointer information generated by the erasure location value generator 16. For instance, the PRML read channel 2 generates erasure pointers over line 6 to compensate for thermal asperities as described below.

To correct a sector using the sector level ECS, a codeword symbol in error is read from the data buffer 10 into register 12 and XORed 24 with the error correction value. The corrected symbol is then restored to the data buffer 10 and the corrected sector transferred to the host system. The sector level error correction operations described above are carried out in asynchronous and overlapping steps in order to facilitate un-interrupted, or "on-the-fly", transfer of data from the disk.

Sampled Amplitude Read Channel

Figure 2:
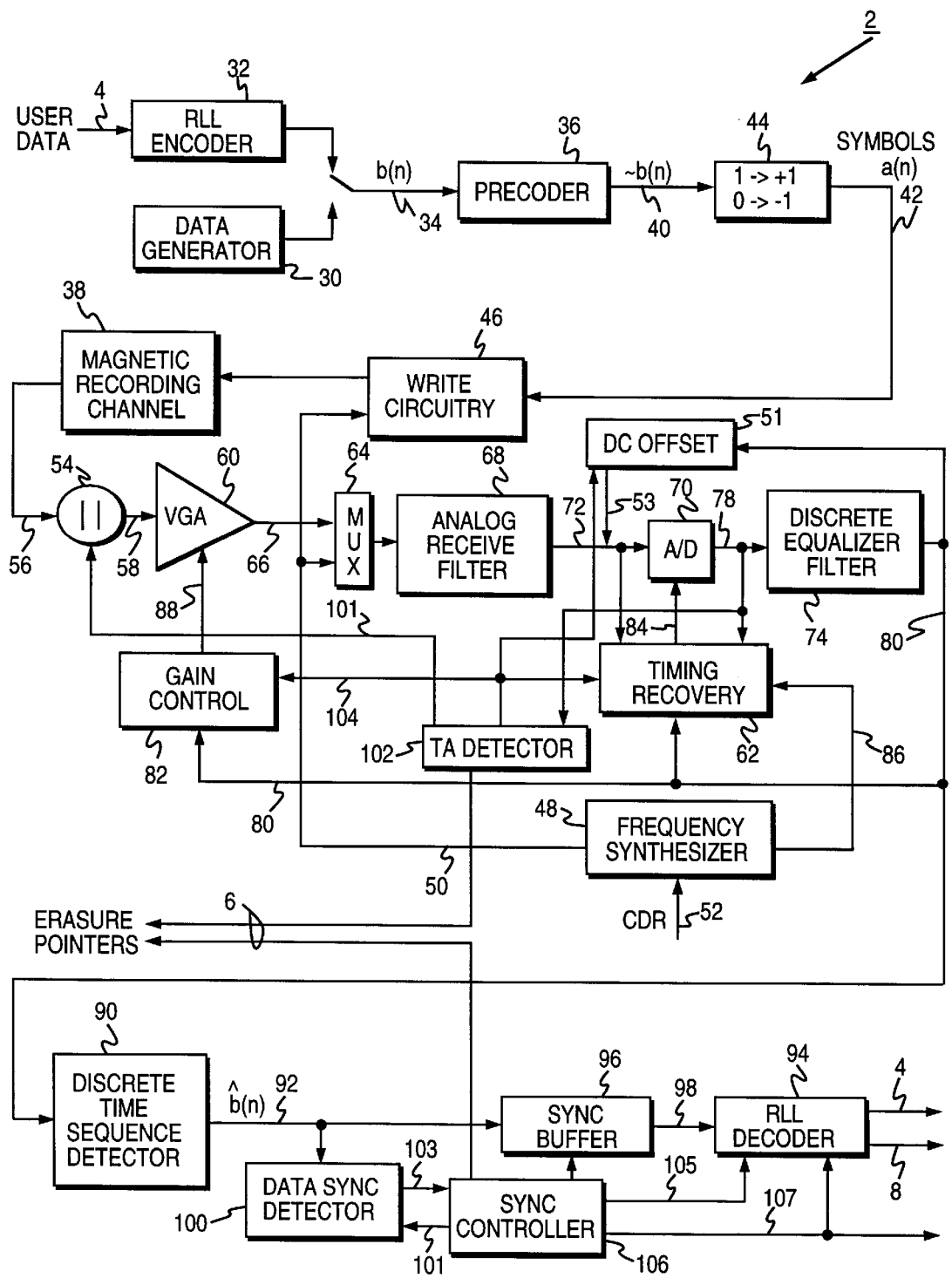
FIG. 2 shows a block diagram of a sampled amplitude read channel of FIG. 1.

Referring now to FIG. 2, shown is a detailed block diagram of a sampled amplitude read channel 2 (e.g., partial response maximum likelihood (PRML) read channel) of FIG. 1. During a write operation, the read channel receives the user data to be stored to the disk over data bus 4. A data generator 30 generates preamble data (for example 2T preamble data) written to the disk prior to writing the user data. The data generator also generates a primary sync mark and at least one secondary sync mark, both for use in synchronizing to the user data during a read operation. An RLL encoder 32 encodes the user data into a binary sequence b(n) 34 according to an RLL constraint. A precoder 36 precodes the binary sequence b(n) 34 in order to compensate for the transfer function of the recording channel 38 and equalizing filters to form a precoded sequence ~b(n) 40. The precoded sequence ~b(n) 40 is converted into symbols a(n) 42 by translating 44 ~b(N)=0 into a(N)=−1, and ~b(N)=1 into a(N)=+1. Write circuitry 46, responsive to the symbols a(n) 42, modulates the current in the recording head coil at the zone baud rate to record a sequence of magnetic transitions onto the magnetic disk 38, wherein the magnetic transitions represent the recorded data. A frequency synthesizer 48 provides a baud rate write clock 50 to the write circuitry 46 and is adjusted by a baud or channel data rate signal (CDR) 52 according to the zone the recording head is over.

When reading the recorded binary sequence from the magnetic disk, an AC coupling capacitor 54 attenuates the DC component of the analog read signal 56 before applying it over line 58 to a variable gain amplifier 60. Before reading the user data, timing recovery 62 first locks to the write frequency by selecting, as the input to the read channel, the write clock 50 through a multiplexor 64. Once locked to the write frequency, the multiplexor 64 selects the analog signal 66 from the read head as the input to the read channel in order to phase lock timing recovery 62 to the acquisition preamble. The variable gain amplifier 60 adjusts the amplitude of the analog read signal 58, and an analog filter 68 provides initial equalization toward the desired response as well as attenuates aliasing noise. A sampling device 70 (normally an analog-to-digital converter (A/D)) samples the analog read signal 72 output by the analog filter 68, and a discrete time filter 74 provides further equalization of the sample values 78 toward the desired response.

The equalized sample values 80 are applied to decision directed gain control 82 and timing recovery 62 for adjusting the amplitude of the read signal 58 and the frequency and phase of the sampling device 70, respectively. Gain control 82 adjusts the gain of variable gain amplifier 60 over line 88, and timing recovery 62 adjusts the frequency of sampling device 70 over line 84 in order to synchronize the equalized samples 80 to the baud rate. Frequency synthesizer 48 provides a course center frequency setting to timing recovery 62 over line 86 in order to center the timing recovery frequency over temperature, voltage, and process variations. The channel data rate (CDR) signal 52 adjusts a frequency range of the synthesizer 48 according to the baud rate for the current zone. A DC offset circuit 51 also processes the equalized samples 80 to track the DC drift in the analog read signal 72. The DC offset is computed and converted into an analog signal 53 that is subtracted from the analog read signal 72, thereby attenuating the deleterious effect a DC offset can have on the detection algorithm.

The equalized samples 80 are ultimately input into a discrete time sequence detector 90, such as a maximum likelihood (ML) Viterbi sequence detector, which detects an estimated binary sequence ^b(n) 92. The estimated binary sequence 92 is buffered in a synchronization buffer 96 to facilitate byte synchronizing (framing) the user data as described below. An RLL decoder 94 decodes the estimated binary sequence 98 output from the sync buffer 96 into estimated decoded user data 4. A data sync detector 100 detects a primary and a secondary sync mark in the estimated binary sequence 92 in order to frame the operation of the RLL decoder 94. In the absence of errors, the estimated binary sequence ^b(n) 92 equals the recorded binary sequence b(n) 34, and the decoded user data 4 equals the recorded user data.

To compensate for thermal asperities, a TA detector 102 monitors the sample values 78 from the A/D converter 70. If the sample values saturate, indicating the presence of a TA, then a pole of the AC coupling capacitor 54 is elevated over line 101 to decrease the TA's time constant (i.e., the decay time). The timing recovery 62, gain control 82, and DC offset 51 loops are held constant for the duration of the TA over line 104. During this time, the TA detector 102 generates and transmits erasure pointers 6 to the erasure location value generator 16 of FIG. 1. The ECC system processes the erasure pointers 6 to correct the symbols corrupted by the thermal asperity (erasure pointers decrease the complexity, cost, and redundancy of the Reed-Solomon decoder while still allowing it to operate on-the-fly.) A programmable number of clock cycles after the DC offset in the analog read signal decays to a tolerable level, the timing recovery 62, gain control 82, and DC offset 51 loops are re-activated and the read channel continues detecting the digital sequence in normal operation.

A thermal asperity may also corrupt the timing recovery preamble or sync mark information, thereby preventing byte synchronization (or framing) of the user data. The inability to synchronize to the user data renders the error correction capability useless, even though most, if not all, of the user data may be uncorrupted. The present invention protects against losing an entire sector when the synchronization information is corrupted by errors, due for example to thermal asperities, by providing at least one secondary synchronization field (sync mark and an optional preamble) for each data sector. In this manner, if the primary synchronization field (preamble and/or sync mark) is corrupted, synchronization may still be achieved using the secondary synchronization field. This significantly improves the chances of successful byte synchronization because of the lower probability that both synchronization fields for a given sector will be corrupted. To this end, the read channel of FIG. 2 further comprises a sync controller 106 for controlling operation of the sync mark detector 100, the sync buffer 96, and the RLL decoder 94. The sync controller 106 is understood with reference to FIGS. 4A–6B which show: various data sector format options provided by the present invention, operation of the sync buffer 96, and the flow charts executed for processing a data sector comprising multiple synchronization fields.

Data Format

Figure 3A:
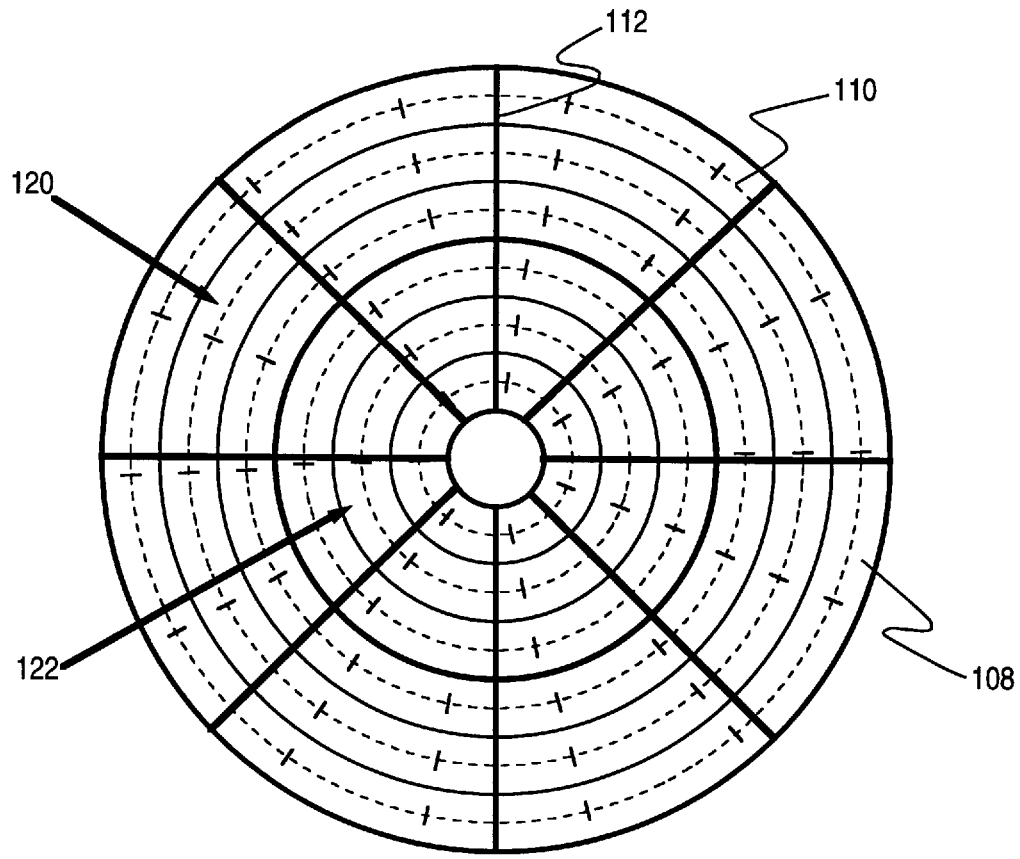
FIG. 3A shows the data format of the magnetic disk comprising a plurality of zoned data sectors and embedded servo wedges.

FIG. 3A shows a conventional data format of a magnetic disk storage medium comprising a series of concentric, radially spaced data tracks 108 wherein each data track 108 comprises a plurality of sectors 110 with embedded servo wedges 112. A servo controller (not shown) processes the servo data in the servo wedges 112 and, in response thereto, positions the read/write head over a desired track. Additionally, the servo controller processes servo bursts within the servo wedges 112 to keep the head aligned over a centerline of the desired track while writing and reading data. The servo wedges 112 may be detected by a simple discrete time pulse detector or by the discrete time sequence detector 90 of FIG. 2. The format of the servo wedges 112 includes a preamble and a sync mark, similar to the user data sectors 110 described below with reference to FIG. 3B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 3A where the disk is partitioned into an outer zone 120 comprising fourteen data sectors per track, and an inner zone 122 comprising seven data sectors per track. In practice, the disk may actually be partitioned into several zones at varying data rates.

Figure 3B:
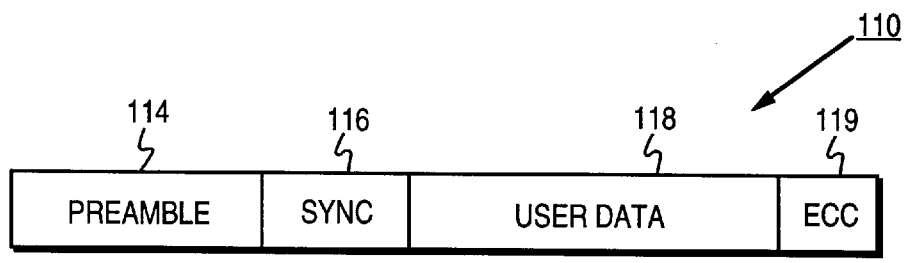
FIG. 3B shows the conventional format of a data sector.

FIG. 3B shows the format of a conventional user data sector 110 comprising an acquisition preamble 114, a sync mark 116, and a user data field 118 including appended ECC bytes 119 for use in detecting and correcting errors in the user data upon readback. Timing recovery 62 of FIG. 2 processes the acquisition preamble 114 to acquire the correct sampling frequency and phase before reading the user data field 118, and the sync mark 116 is used to byte synchronize to the user data field 118. As described above, errors induced through system dynamics (e.g., thermal asperities) can corrupt the preamble and/or sync mark fields which may render the entire data sector unrecoverable.

Figure 4A:
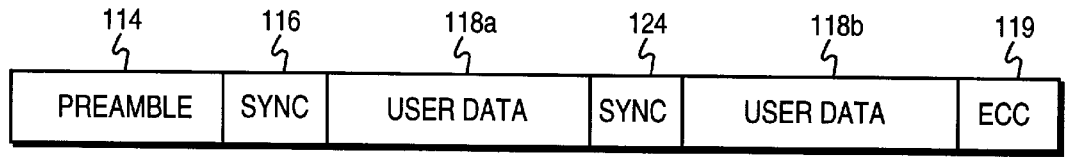
FIG. 4A–4E show the data sector formats provided by the present invention including a primary and secondary sync mark for each data sector.
Figure 4B:
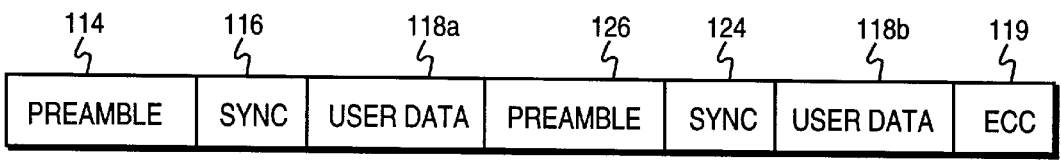
Figure 4C:
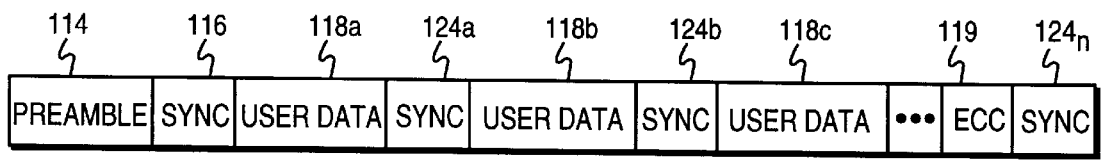

FIG. 4A shows a data sector format of the present invention including a secondary sync mark 124 for use in synchronizing to the user data field 118 in the event that the primary synchronization fields (preamble 114 and/or sync mark 116) are undetectable. The recording area 118a inbetween the primary and secondary sync marks may be void, or it may be filled with user data. In the latter embodiment, to recover the user data 118a inbetween the sync marks when the primary sync mark is undetectable the present invention employs either random symbol error correction, erasure pointer error correction, or retroactive synchronization using the read channel sync buffer 96 of FIG. 2, or any combination thereof. The implementation of erasure pointers and retroactive resynchronization is disclosed in greater detail below.

The primary and secondary sync marks may be selected so as to be error tolerant, meaning there is a high probability of valid detection and a low probability of false detection in the presence of errors and random user data (see Appendix A for details on how to construct an error tolerant sync mark). The extent of error tolerance achievable in a sync mark is proportional to the length of the sync mark pattern. Because the secondary sync mark 124 is utilized only when the primary sync mark is undetectable, in the preferred embodiment the secondary sync mark 124 is selected to be less error tolerant than the primary sync mark 116; that is, the secondary sync mark 124 is selected to be shorter in length than the primary sync mark 116 in order to maximize format efficiency. Also in the preferred embodiment, the secondary sync mark pattern 124 is selected to be a subset of the primary sync mark pattern so that a subset of the circuitry 100 for detecting the primary sync mark can be used to detect the secondary sync mark. Further, the primary and secondary sync marks are differentiated by timing when they occur relative to other sector data (e.g., relative to the primary preamble or to the embedded servo wedges 112 of FIG. 3A). In an alternative embodiment, the primary and secondary sync marks are differentiated by selecting different patterns for each sync mark, but this embodiment requires additional sync mark detection circuitry 100 to detect the different sync mark patterns.

There may be situations where the primary preamble 114 is also corrupted by errors, thereby preventing successful phase lock before reading the primary sync mark 116 and/or the user data. If the gap 118a between the primary and secondary sync mark is filled with user data (to maximize format efficiency), the present invention can process this user data 118a to acquire phase lock; then byte synchronization is achieved using the secondary sync mark 124 for synchronizing retroactively to the preceding user data 118a as well as to the remainder of the user data 118b. In an alternative data sector format shown in FIG. 4B, a secondary preamble 126 is optionally included before the secondary sync mark for use in acquiring phase lock when the primary preamble 114 is corrupted by errors. This format may be more efficient since phase locking to preamble data is faster than phase locking to random user data. In other words, the gap 118a inbetween the primary and secondary sync mark may be shorter if a secondary preamble 126 is employed, thereby reducing the number of erasure pointers needed to correct the gap data and/or the length of the sync buffer 96, if employed.

In any case, the present invention provides the secondary preamble 126 as a programmable option which is configured as desired by the end user. Additionally, the gap length 118a between the primary and secondary sync mark is programmable to allow further customization according to the system requirements. For example, the gap length 118a can be adjusted relative to the number of erasure pointers available for correcting the gap user data, and/or relative to the length of the sync buffer 96 of FIG. 2.

Another aspect of the present invention is the ability to resynchronize to the user data when initial synchronization is lost due, for example, to a loss of frequency lock or slipping one or more cycles in timing recovery. Referring to the data sector format of FIG. 4C, to facilitate resynchronization multiple secondary sync marks 124a, 124b, . . . are interspersed at regular intervals within the user data field, where the interval length is programmable. Then when synchronization is lost, the system resynchronizes to the data field using the next encountered sync mark. Loss of synchronization is detected by the sync controller 106 when a secondary sync mark is detected at the wrong time relative to the detected user data (i.e., either too soon or too late). In this manner, the present invention can resynchronize to every segment between sync marks using a "split segment" synchronization technique described below.

If the initial frequency lock is lost, then with reference to FIG. 2 the system performs the following steps to re-establish frequency and phase lock:

1. the write clock 50 is selected through multiplexer 64 as the input into the sampling device 70 to re-establish frequency lock;
2. when frequency lock is re-established, the analog receive signal 66 is again selected as the input to the sampling device 70 in order to re-establish phase lock over the data field; and
3. when phase lock is re-established, the next detected secondary sync mark is used to re-establish byte synchronization over the data field, including retroactive synchronization over the data preceding the secondary sync mark.

In an alternative embodiment, rather than re-establish frequency lock to the write clock 50, the loop filter in the timing recovery circuit 62 is initialized from a register which stores the VFO setting that provided the initial frequency lock. In this manner, frequency lock can be re-established instantly to avoid the delay associated with locking to the write clock 50. In yet another embodiment, the read signal is sampled asynchronously with timing recovery 62 implemented as a time-varying interpolation filter, wherein the step of frequency locking to the write clock 50 is not even necessary. This aspect of the present invention is better understood with respect to the implementation of timing recovery 62 described in greater detail below with reference to FIG. 7A–7D. After resynchronizing to the data field, erasure pointers may be generated for recovering the user data inbetween the sync marks where synchronization was lost. Further, the present invention allows for retroactive resynchronization to the user data stored in the sync buffer 96. This aspect of the present invention is also described in more detail below.

Figure 4D:
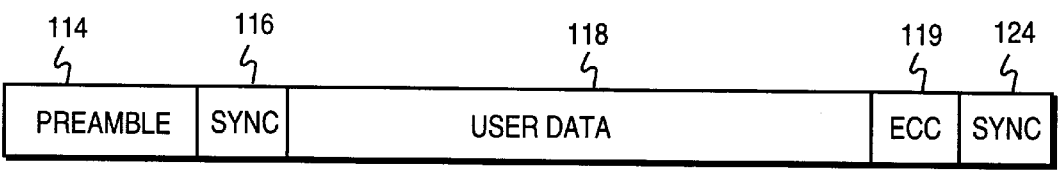

The present invention's use of multiple sync marks can be extended to include a primary sync mark 116 at the beginning of the user data field and a secondary sync mark 124 at the end of the sector as shown in FIG. 4D. Obviously this format requires a larger sync buffer 96 in order to store an entire data sector and enable recovery from an undetectable primary sync mark, or to recover from loss of synchronization. In other words, if the primary sync mark 116 is undetectable, then the secondary sync mark 124 is used to retroactively synchronize over the entire data sector. And if initial synchronization is lost, the primary and secondary sync marks are used to synchronize respective sections of a data segment preceding and following the loss of synchronization (i.e., "split segment" synchronization). Again, this aspect of the present invention is described in greater detail below.

Figure 4E:
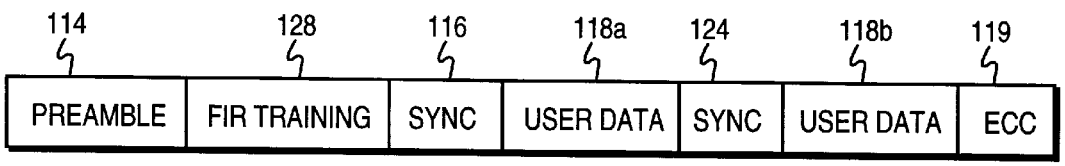

Yet another data sector format provided by the present invention is shown in FIG. 4E. In this format, an FIR training pattern 128 is inserted inbetween the primary preamble 114 and the primary sync mark 116. This FIR training pattern 128 is for use by the sampled amplitude read channel of FIG. 2 when the discrete equalizer 74 is real time adaptive (see U.S. patent application Ser. No. 08/640,410 entitled "Gain and Phase constrained Adaptive Equalizer Filter in a Sampled Amplitude Read Channel for Magnetic Recording"). That is, before attempting to read the primary sync mark and the user data field, the FIR training pattern 128 is processed to determine optimal initial settings for the coefficients of the FIR filter in the discrete equalizer 74.

Thus, the present invention provides a number of different options for the data sector format which can be programmably configured depending on the system requirements. In the following section, details of the sync mark controller 106 of FIG. 2 are disclosed to illustrate the operation of the present invention with respect to the secondary sync marks. The preferred embodiment employs a sync buffer 96 for retroactive synchronization relative to a secondary sync mark, but use of a sync buffer is optional as will be explained in the alternative embodiments below.

Sync Controller

Referring again to FIG. 2, the sync controller 106 controls operation of the data sync detector 100, the sync buffer 96, and the RLL decoder 94. The sync controller 106 configures the data sync detector 100 to detect the appropriate sync mark (primary or secondary) over line 101 at the appropriate times during a read operation. The estimated data sequence 92 output by the sequence detector 90 is buffered into the sync buffer 96 and simultaneously processed by the data sync detector 100. The data sync detector 100 compares the estimated data sequence 92 to the target sync pattern and asserts a sync detect signal over line 103 when the number of matching bits exceeds a predetermined threshold (see Appendix A for implementation details of the data sync detector 100). The sync controller 106 coordinates the data transfer to and from the sync buffer 96 relative to when the sync marks are detected.

Figures 5A, 5B:
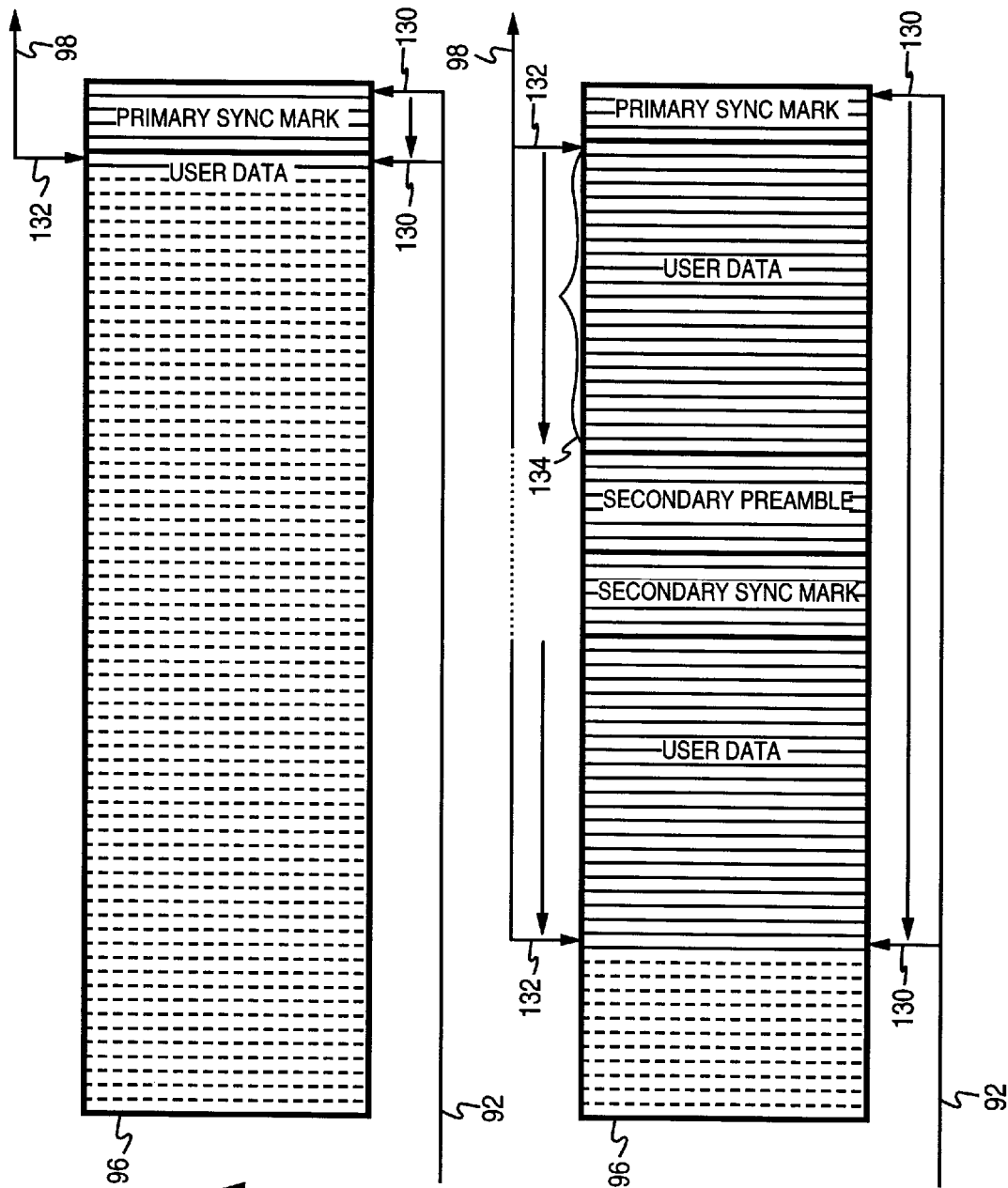
FIG. 5A illustrates operation of the sync buffer of the present invention when the primary sync mark is successfully detected.
FIG. 5B illustrates operation of the sync buffer of the present invention when the primary sync mark is undetectable.

Details of the sync buffer 96 are shown in FIG. 5A and 5B. The sync controller 106 manages two pointers into the sync buffer 96: an input pointer 130 to a location in the buffer where the next byte of the incoming estimated data sequence 92 is stored, and an output pointer 132 to a location in the buffer where the current output data 98 is retrieved and transferred to the RLL decoder 94. The length of the sync buffer 96 is determined by various system parameters such as the distance between the primary and secondary sync marks and the transfer speed from the sync buffer 96 to the ECC system of FIG. 1. The length is selected so that buffer overflow is a rare occurrence (a buffer overflow is not a fatal error since the storage system can always perform a retry operation). The sync controller 106 begins to load the sync buffer 96 with the estimated data sequence 92 as soon as the search for the primary sync mark is enabled. Thus, the sync buffer will always include at least part of the primary sync mark whether or not it is successfully detected.

FIG. 5A illustrates the operation of the sync buffer 96 when the primary sync mark is successfully detected. In this case, none of the user data is buffered—the input pointer 130 always equals the output pointer 132 so as to avoid any latency associated with decoding and transferring the data to the ECC system of FIG. 1.

FIG. 5B illustrates the case when the primary sync mark is undetectable, but the secondary sync mark is detected. In this case, the data stored in the sync buffer includes at least part of the primary sync mark, the user data inbetween the primary and secondary sync mark (or secondary preamble), and a variable number of user data bytes after the secondary sync mark. Data transfer out of the sync buffer to the RLL decoder is delayed until the secondary sync mark has been successfully detected. In this manner, it is possible to retroactively synchronize to the user data 134 inbetween the primary and secondary sync marks rather than rely on erasure pointers to correct all of this data.

When the primary sync mark is undetectable due to errors, there is a high probability that at least some of the user data 134 following the primary sync mark will also be undetectable. Thus, in addition to retroactive synchronization, the present invention provides a programmable number of erasure pointers 6 generated by the sync controller 106 starting at the beginning of the user data field. Corrupted user data not covered by an erasure pointer must be corrected by the normal operation of the ECC system; there is a trade off between the number of erasure pointers generated and the number of other random errors that can be corrected. Thus, another aspect of the invention is that the number of erasure pointers 6 is programmable so that during multiple retry operations the number of erasure pointers generated that are associated with an undetectable primary sync mark can be adjusted until the data sector is successfully recovered.

Referring again to FIG. 2, after detecting the sync mark the sync controller 106 enables operation of the RLL decoder 94 over line 105 and begins to transfer data from the sync buffer 96 to the RLL decoder 94 over line 98. If the primary sync mark is successfully detected as shown in FIG. 5A, then the data transfer rate from the sync buffer 96 to the RLL decoder 94 matches the data rate of the read channel. That is, user data is read from the sync buffer as soon as it is input in order to avoid any delay in decoding and transferring the data to the ECC system. The data controller 106 keeps track of when the secondary sync marks (and secondary preamble) occur in the estimated data sequence; this data is then extracted rather than decoded by the RLL decoder 94.

In the event the primary sync mark is undetectable as in FIG. 5B, the sync controller 106 delays transferring user data out of the sync buffer until the second sync mark has been detected. Then the sync controller 106 byte synchronizes to the user data stored in the sync buffer, including the user data 134 stored inbetween the primary and secondary sync mark, and begins to transfer the user data to the RLL decoder 94. Preferably the ECC system of FIG. 1 is designed to operate faster than the read channel data rate. In this manner, the user data buffered in the sync buffer 96 can be transferred to the ECC system faster than it is being stored into the sync buffer 96, until eventually the output pointer 132 "catches up" to the input pointer 130 as shown in FIG. 5B. Thus, by the time the entire data sector has been read, the latency associated with buffering the user data initially is not seen by the ECC system (i.e., the time to read an entire data sector is no different than if secondary sync marks were not employed). To facilitate this aspect of the invention, the sync controller 106 generates a variable rate data transfer clock 107 for coordinating the data transfer rate from the RLL decoder 94 to the ECC system of FIG. 1.

In an alternative embodiment, the sync buffer 96 is implemented as a circular buffer wherein the input pointer 130 and the output pointer 132 are adjusted at the data rate of the channel. As described in greater detail below, a circular buffer facilitates retroactive resynchronization when the initial synchronization is lost. However, if implemented as a circular buffer, the ECC system of FIG. 1 must account for the latency of the sync buffer 96 when reading consecutive data sectors. In the preferred embodiment, consecutive read operations are overlapped; that is, during a consecutive read operation, data from the next data sector begins to fill the sync buffer 96 before the previous data sector is completely transferred out of the sync buffer 96.

Figure 6A:
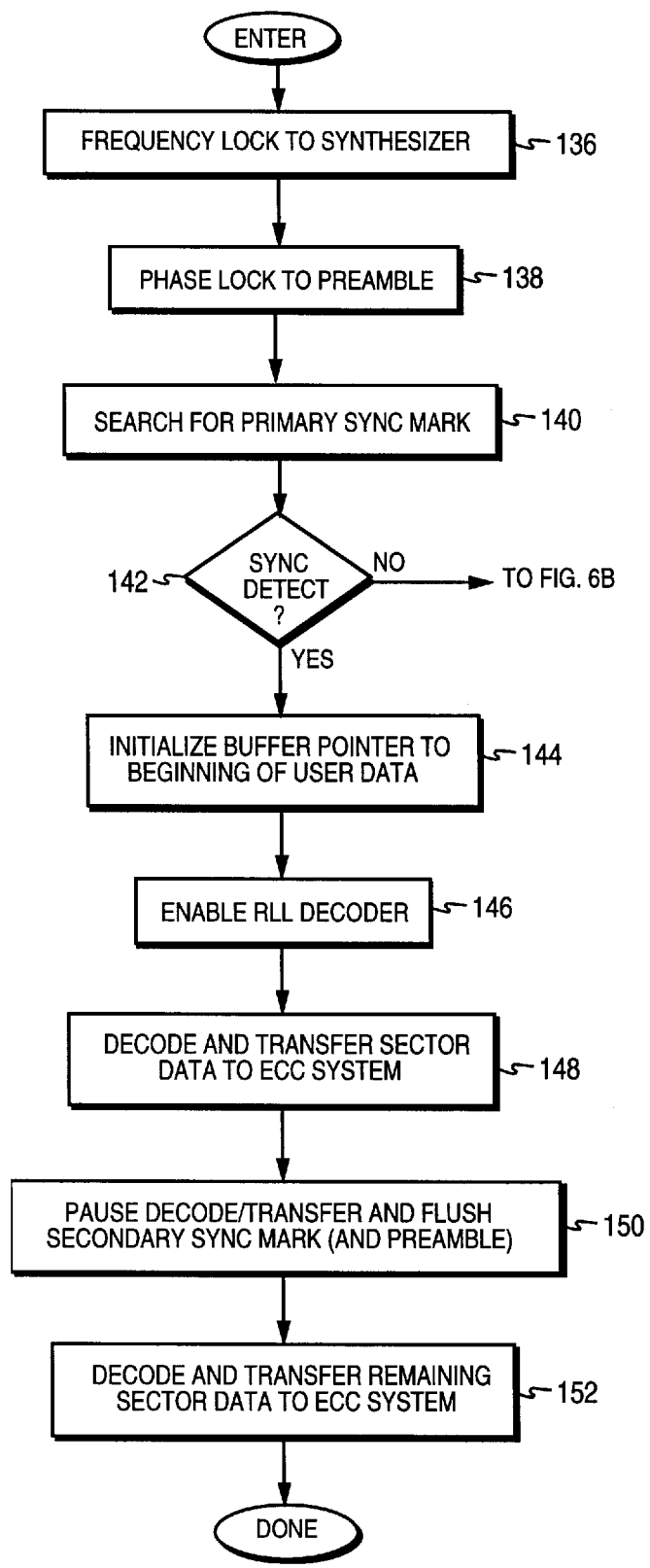
FIG. 6A–6B are a flow chart illustrating the operation of the present invention when reading a data sector from the disk.
Figure 6B:
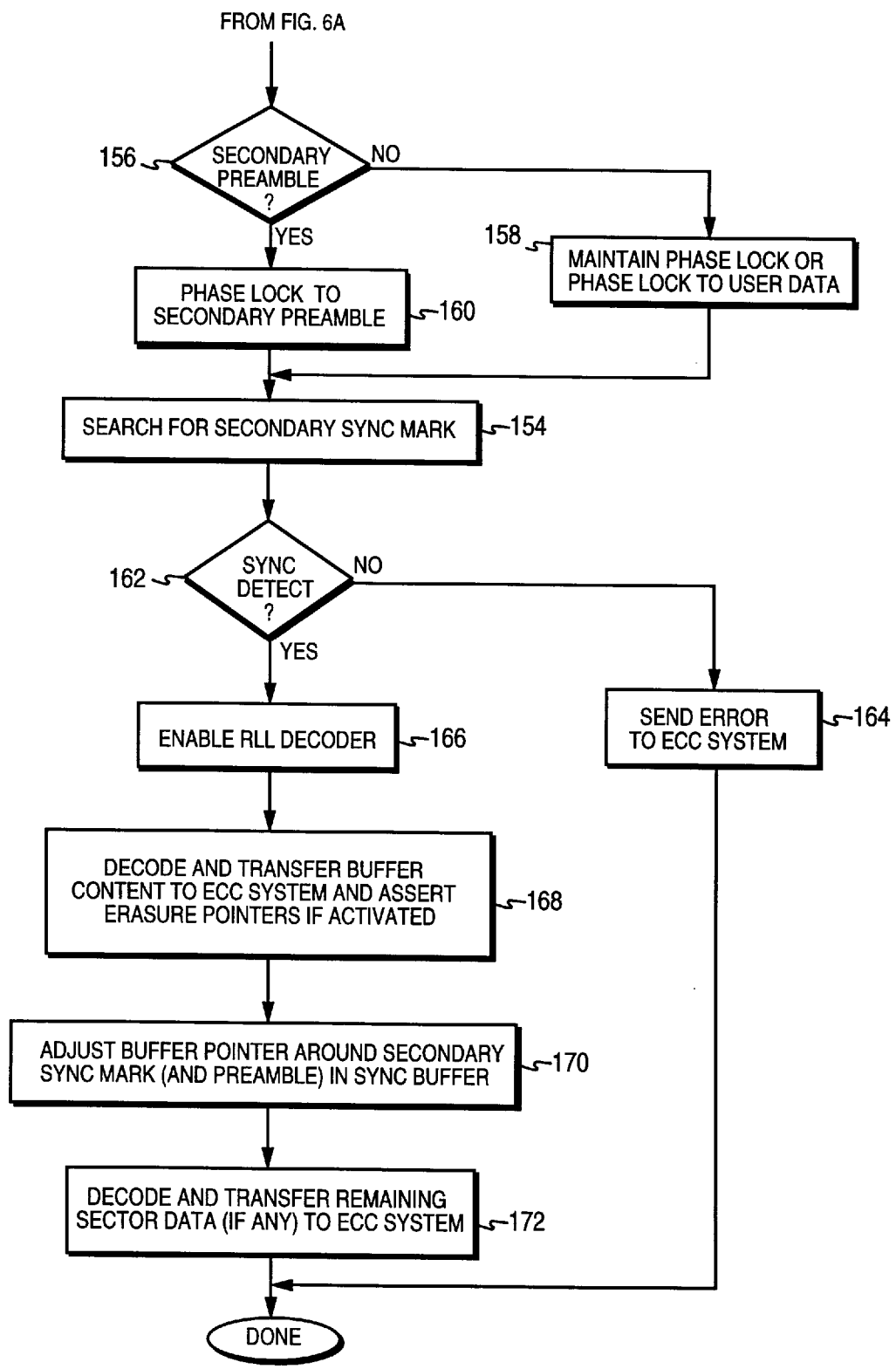

Operation of the sync controller 106 is further understood with reference to FIGS. 6A–6B which show a flow chart executed during a read operation. With reference to FIG. 2, before reading a data sector the first step 136 is to multiplex 64 the write clock 50 into the input of the read channel and thereby frequency lock to the synthesizer 48 which is configured to the channel data rate of the current zone by the CDR signal 52. Once frequency locked, the read signal 66 is multiplexed into the input of the read channel in order to phase lock to the primary preamble 138. Thereafter the data sync detector 100 is programmed to detect the primary sync pattern and enabled to begin searching for the primary sync mark in the estimated data sequence 140.

Continuing with FIG. 6A, if the primary sync mark is successfully detected 142, then the output sync buffer pointer 132 is set to the beginning of the user data 144 (i.e., to the input buffer pointer 130). Then the RLL decoder is enabled 146 and the user data is decoded and transferred to the ECC system 148. When the secondary sync mark (and preamble) reaches the sync buffer, the decoding and transfer is paused and this data is discarded 150. Then the remainder of the sector data is decoded and transferred to the ECC system, while discarding subsequent sync marks (and preambles) if employed.

Continuing now to FIG. 6B, when the primary sync mark is undetectable then if a secondary preamble is implemented 156, the read channel is phase locked using the secondary preamble pattern 160. If a secondary preamble is not employed, then the read channel either maintains phase lock or phase locks to the user data inbetween the primary and secondary sync marks 158. In the case where a secondary preamble is not employed, the system assumes that the read channel was at least partially phase locked after reading the primary preamble (even if corrupted), and phase locking to the user data merely completes the process. Once phase locked is established, the sync detector 100 is programmed to detect the secondary sync mark pattern and enabled to begin searching for the secondary sync mark in the estimated user data 154. If the secondary sync mark is undetectable, then an error signal is transmitted to the ECC system 164 to initiate a retry (assuming no other secondary sync marks are employed).

If the secondary sync mark is detected as shown in FIG. 5B, then continuing with FIG. 6B the RLL decoder is enabled 166 and the user data stored in the sync buffer is decoded and transferred to the ECC system 168. When the output buffer pointer reaches the secondary sync mark (and preamble), the pointer is adjusted around this data in order to discard it 170. Then the remainder of the sector data is decoded and transferred to the ECC system 172 and any further secondary sync marks discarded.

The sync controller 106 has been described above relative to the data format of FIG. 4A and 4B, that is, relative to a data sector having a primary sync mark at the beginning of the user data field and a secondary sync mark recorded some number of bytes within the user data field. As described above, however, the present invention also applies to a data sector having multiple secondary sync marks interspersed within the user data field at a regular interval as in FIG. 4C, or to a data sector comprising a primary sync mark at the beginning of the user data field and a secondary sync mark at the end of the sector as in FIG. 4D. Those skilled in the art will recognize that the operation of the sync controller 106 and size of the sync buffer 96 can be modified accordingly to account for these alternative sector formats. Further, when multiple secondary sync marks are interspersed within the data field, the present invention can synchronize the entire data sector to any one of the secondary sync marks, and it requires only a larger sync buffer 96 for storing multiple data sector "segments" between the sync marks.

Yet another benefit derived from multiple secondary sync marks is the ability to resynchronize to the data sector several times if synchronization is lost. That is, the present invention can resynchronize to the data sector within each segment of sector data between detected sync marks; the more secondary sync marks employed (i.e., the greater number of sector segments), the greater protection against losing synchronization multiple times within the sector. The process of resynchronizing to the data sector using multiple sync marks is described in the following section.

Split Segment Resynchronization

Referring again to FIGS. 4A–4D, another potential error event when reading the user data is that timing recovery may lose frequency lock or slip one or more cycles in the timing recovery PLL. In other words, if the initial frequency or phase lock is lost, the present invention re-establishes frequency and phase lock over the user data according to the steps set forth above, and then re-establishes byte synchronization to the user data at the next detected secondary sync mark. This aspect of the invention is understood with reference to FIGS. 7A–7D which shows details of timing recovery 62, and with reference to FIG. 8A and 8B which illustrate "split segment" data recovery techniques using the sync buffer 96 and erasure pointers 6.

Figure 7A:
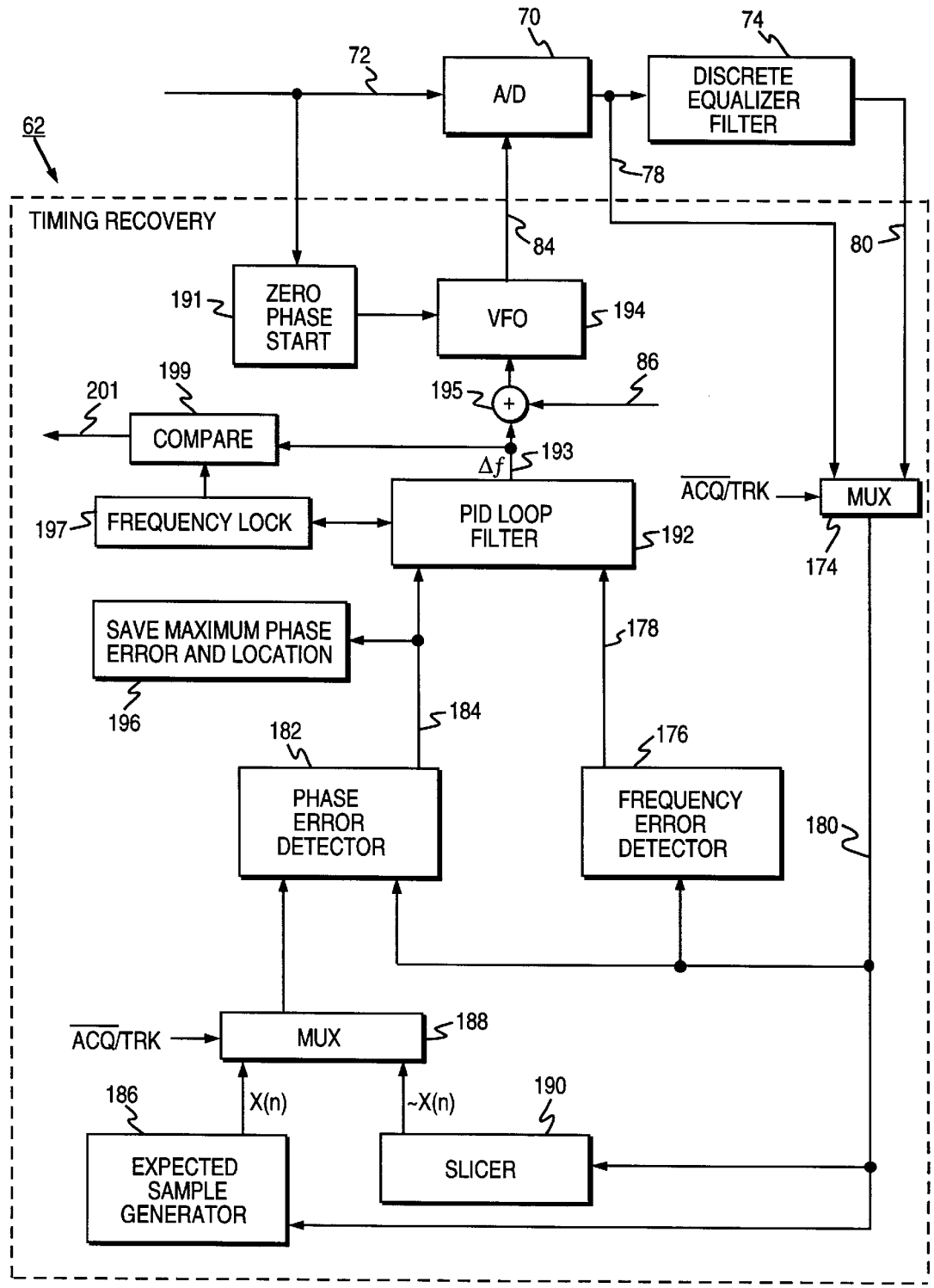
FIG. 7A is a detailed diagram of a conventional timing recovery circuit which synchronizes the sampling to the baud rate.

In review, timing recovery performs the following operations when reading a data sector: first it frequency locks to the write clock, then it frequency and phase locks to the acquisition preamble, then it tracks the user data. These operations are carried out by a decision directed feedback system implemented as a phase lock loop (PLL), the components of which are shown in FIG. 7A. In general, the PLL attempts to frequency and phase lock the sampling clock 84 to the baud rate by minimizing a frequency and phase error.

In operation a multiplexer 174 selects the sample values at the input of the discrete time equalizer 74 during frequency lock and acquisition, and the output of the discrete time equalizer 74 during tracking. This removes the latency associated with the equalizer from the PLL, thereby resulting in faster frequency and phase locking.

When frequency locking to the write clock 50 (and when acquiring the acquisition preamble), a frequency error detector 176 computes a frequency error 178 from the unequalized sample values 78 via multiplexer 174 over line 180. During acquisition, a phase error detector 182 generates a phase error 184 from the unequalized sample values 78 and from expected (or ideal) sample values X(n) generated by an expected sample generator 186 via multiplexer 188. During tracking, the phase error is generated from the equalized samples 80 (via multiplexer 174 and line 180) and from estimated samples ~X(n) generated by a slicer 190 via multiplexer 188. The estimated samples ~X(n) generated by the slicer 190 correspond to estimated ideal samples that would be generated in the absence of noise if the read channel were perfectly equalized and synchronized (frequency and phase locked).

The frequency error 178 and the phase error 184 are filtered by a PID loop filter 192 which provides control over the closed loop response of the PLL. The output of the PID loop filter 192 is a frequency offset $\Delta f$ 193 that settles to a value proportional to a frequency difference between the sampling clock 84 and the baud rate. The frequency offset $\Delta f$ 193 is added to the center frequency setting 86 generated by the frequency synthesizer 48 of FIG. 1. at adder 195, and the output of adder 195 adjusts the output frequency of a variable frequency oscillator (VFO) 194 in order to synchronize the sampling clock 84 to the baud rate (i.e., in order to minimize the frequency and phase error).

A zero phase start 191 circuit suspends operation of the VFO 194 at the beginning of acquisition in order to minimize the initial phase error between the sampling clock 84 and the read signal 72. This is achieved by disabling the VFO 194, detecting a zero crossing in the analog read signal 72, and re-enabling the VFO 194 after a predetermined delay between the detected zero crossing and the first baud rate sample.

After establishing frequency lock over the write clock 50 at the beginning of a read operation, the initial frequency offset $\Delta f$ 193 is saved in a register 197. Then while reading the sector data, the saved value is compared to the current frequency offset $\Delta f$ 193 at comparator 199. If the frequency offset $\Delta f$ 193 deviates from the initial value beyond a predetermined threshold, it indicates a loss of frequency lock 201. When this happens, to re-establish frequency lock the PID loop filter 192 is reset with the value stored in register 197. Thereafter the timing recovery PLL re-establishes phase lock over the user data or, if provided, over a secondary preamble field embedded within the data sector as described above with reference to FIGS. 4A–4D.

Figure 7B:
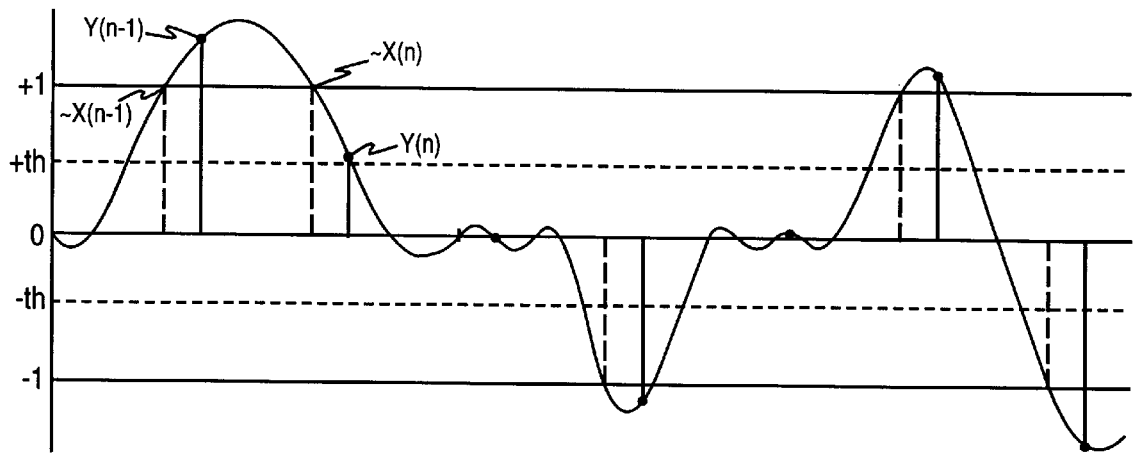
FIG. 7B and 7C illustrate the operation of the phase error detector of the timing recovery circuit shown in FIG. 7A.
Figure 7C:
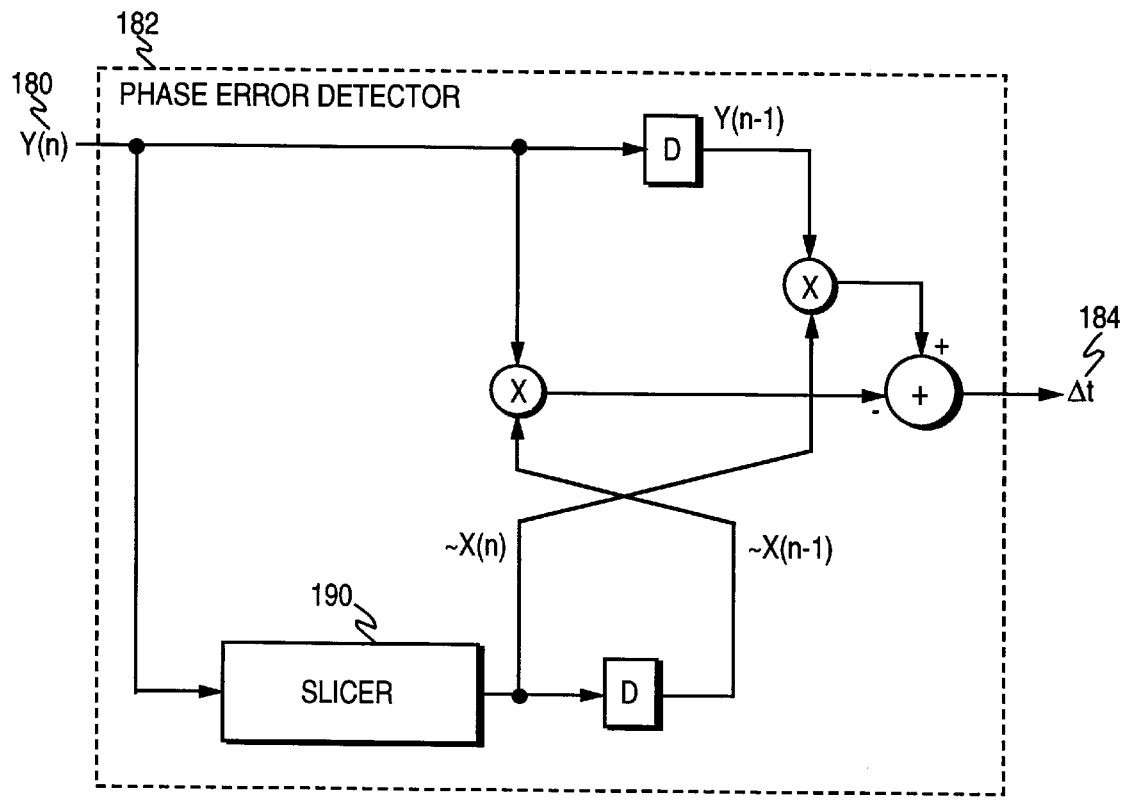

Operation of the phase error detector 182 of FIG. 7A is understood with reference to FIGS. 7B and 7C, where FIG. 7B is a waveform equalized to a PR4 response and sampled with some arbitrary phase error, and FIG. 7C shows a circuit for computing the phase error. The phase error detector of FIG. 7C computes a stochastic timing gradient $\Delta t$ which minimizes a mean squared error between the signal sample values and estimated ideal sample values according to the following equation, $$\Delta t(n) = Y(n-1) \cdot {\sim}X(n) - Y(n) \cdot {\sim}X(n-1)$$

where Y(n) are the signal sample values 180 and ~X(n) are the estimated samples ~X(n) generated by the slicer 190. The slicer operates by comparing the signal sample values 180 to positive and negative thresholds, where a +1 or −1 are output if the thresholds are exceeded and a 0 output otherwise.

Those skilled in the art will recognize that the present invention can easily be implemented in other types of sampled amplitude read channels (e.g., EPR4 and EEPR4) in which case the slicer 190 and phase error detector 182 would be modified accordingly. Details of the frequency error detector 176 and expected sample value generator 186 are not provided because they are not germane, or necessary to enable, the present invention; however, a complete description of these components can be found in U.S. patent application Ser. No. 08/313,491 entitled "Improved Timing Recovery for Synchronous Partial Response Recording."

Figure 7D:
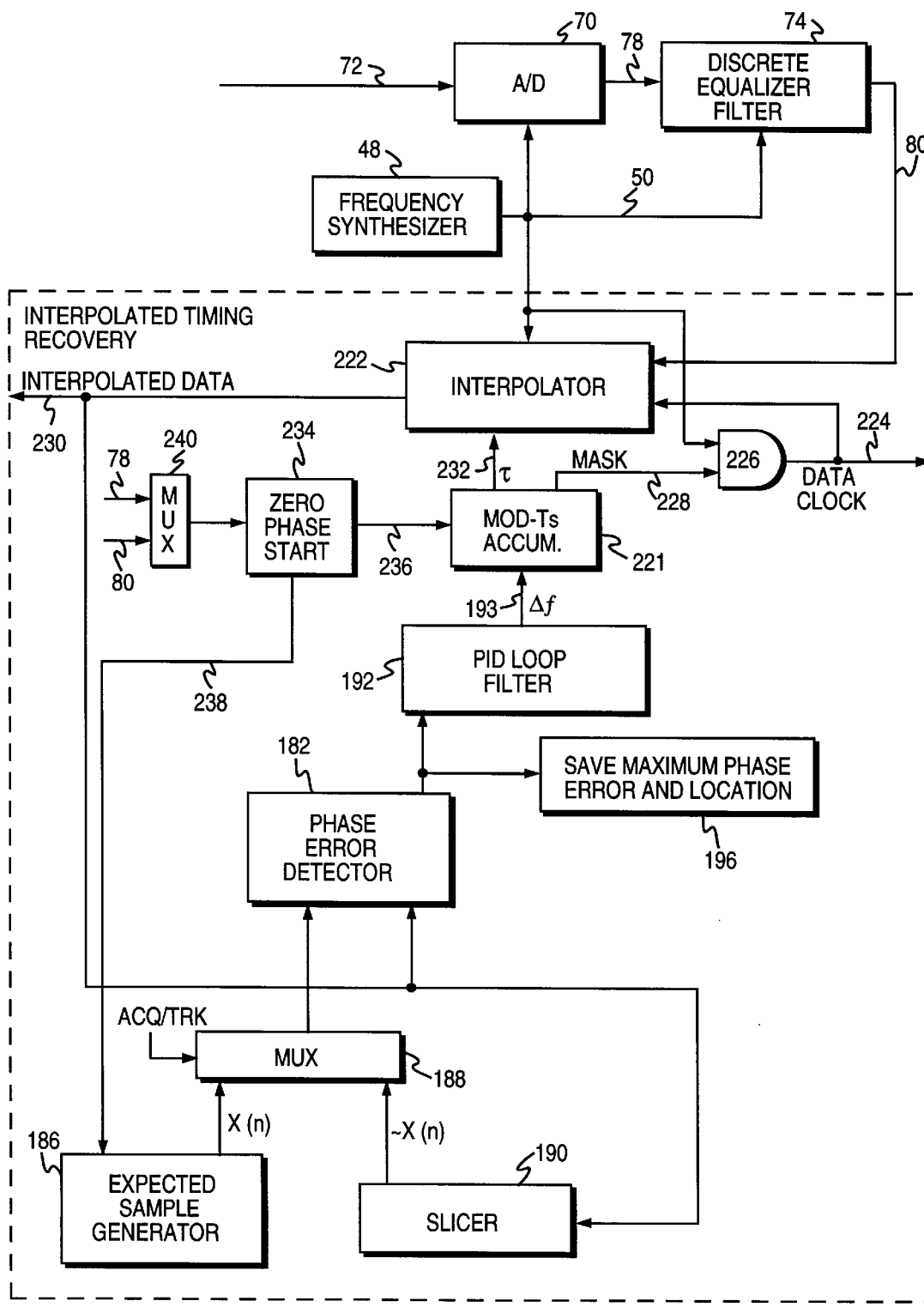
FIG. 7D illustrates an alternative embodiment for timing recovery which employs asynchronous sampling and an interpolation filter for interpolating to the baud rate samples.

An alternative to the synchronous sampling timing recovery of FIG. 7A is to sample asynchronously and interpolate to the baud rate samples. This embodiment is shown in FIG. 7D. The VFO 194 in the conventional timing recovery of FIG. 7A is replaced with a modulo-Ts accumulator 221 and an interpolator 222. A data clock 224 is generated at the output of an AND gate 226 in response to the sampling clock 50 and a mask signal 228 from the modulo-Ts accumulator 221. The data clock 224 is for clocking operation of the read channel components downstream from interpolated timing recovery (sequence detector, sync detector, etc.). The phase error detector 182 and the slicer 190 process interpolated sample values 230 at the output of the interpolator 222 rather than the channel sample values 80 at the output of the discrete equalizer filter 74 as in FIG. 7A. A PID loop filter 192 controls the closed loop frequency response, similar to the loop filter 192 of FIG. 7A, and generates a frequency offset signal $\Delta f$ 193. The frequency offset $\Delta f$ 193 is accumulated by the modulo-Ts accumulator 221 to generate an interpolation interval $\tau$ 232 for use by the interpolator 222 in computing the interpolated sample values 230.

In the interpolated timing recovery of the present invention, locking a VFO to a reference frequency before acquiring the preamble is no longer necessary; multiplexing 64 the write clock 50 into the analog receive filter 68 (as in FIG. 2) is not necessary. Further, the sampling device 70 and the discrete equalizer filter 74, together with their associated delays, have been removed from the timing recovery loop; it is not necessary to multiplex 174 around the equalizer filter 74 between acquisition and tracking. However, it is still necessary to acquire a preamble 114 before tracking the user data 118. To this end, a zero phase start circuit 234 minimizes the initial phase error between the interpolated sample values and the baud rate at the beginning of acquisition similar to the zero phase start 191 of FIG. 7A. However, rather than suspend operation of a sampling VFO 194, the zero phase start 234 for interpolated timing recovery computes an initial phase error $\tau$ from the A/D 70 sample values 78 or the equalized sample values 80 (selected via multiplexer 240) and loads this initial phase error into the modulo-Ts accumulator 221 over line 236. The zero phase start 234 also generates a signal 238 for initializing the starting state of the expected sample generator 186.

The relevance of the above discussion to the resynchronization technique of the present invention is as follows: when the timing recovery PLL loses frequency lock or slips a cycle, the location within the data sector can be determined by examining the phase errors. That is, when synchronization is lost, it will be reflected in timing recovery as an increase in the phase error. Thus, the timing recovery circuit of the present invention includes a circuit 196 which compares and saves a metric based on the phase error (e.g., the maximum phase error) between sync marks as well as its location within the data sector. Then, when frequency lock is lost or a cycle slips, the phase error metric demarks a "dividing line" for forward synchronizing a first section of a data segment using the first sync mark, and retroactive synchronizing a second section of the data segment using the second sync mark (i.e., "split segment" synchronization).

Figure 8A:
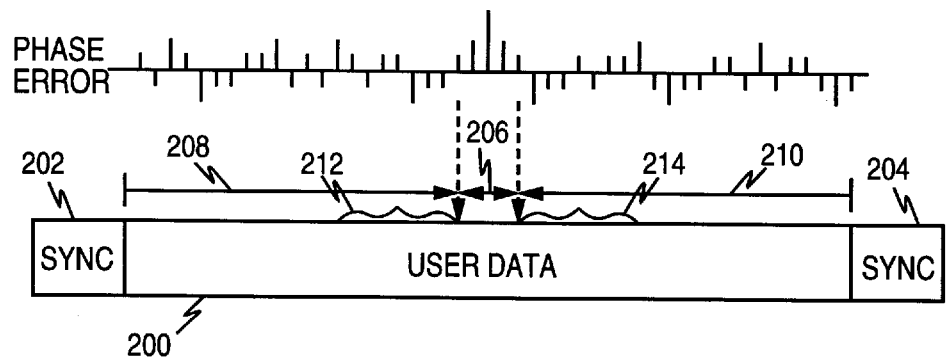
FIG. 8A and 8B illustrate the resynchronization techniques of the present invention.
Figure 8B:
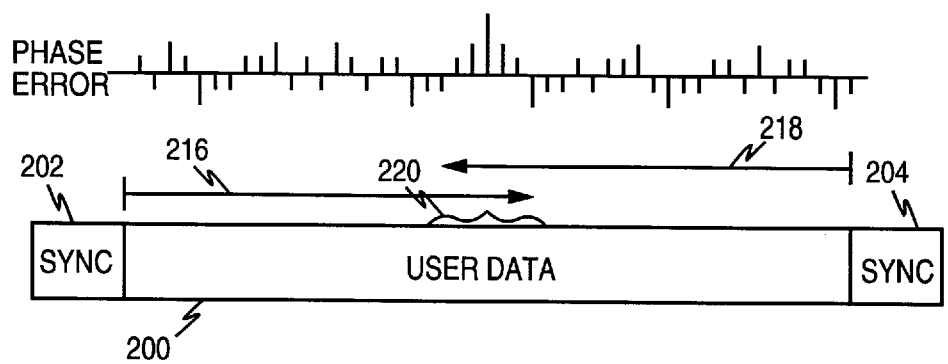

This is illustrated in FIG. 8A and 8B which show a data segment 200 between a first sync mark 202 and a second sync mark 204 and, above that, the corresponding phase errors generated when reading this data. As described above, loss of synchronization is detected when the secondary sync mark 204 is detected at the wrong time (too early or too late) with respect to the detected user data. Because the detected data segment 200 is buffered in a sync buffer 96 (assuming the sync buffer is implemented as a circular buffer with latency), the present invention uses both sync marks to synchronize to the data segment 200 toward one another, and toward the maximum phase error. Furthermore, a "window" may be defined around the location of the maximum phase error wherein erasure pointers are generated to assist the ECC system in correcting this data.

FIG. 8A shows the case where the loss of synchronization results in more data 200 being detected than expected (i.e., the secondary sync mark 204 is detected too late). Consequently, a section 206 of the detected data surrounding the occurrence of the phase error is discarded, and the first and secondary sync marks used to synchronize to the remaining data. This is accomplished by using the first sync mark 202 to synchronize a first section 208 of the data segment preceding the occurrence of the maximum phase error, and using the secondary sync mark 204 to synchronize a second section 210 of the data segment following the occurrence of the maximum phase error. Additionally, erasure pointers 212 and 214 may be generated corresponding to a predetermined number of the synchronized data symbols near the occurrence of the maximum phase error.

FIG. 8B shows the case where the loss of synchronization results in less data 200 being detected than expected (i.e., the secondary sync mark 204 is detected too early). In this case, the detected data synchronized using the first and secondary sync marks overlaps to account for the truncation. That is, the first sync mark 202 synchronizes a first section 216 of the data segment extending through the occurrence of the maximum phase error, and the second sync mark 204 synchronizes an overlapping second section 218 of the data segment also extending through the occurrence of the maximum phase error. As in FIG. 8A, a predetermined number of erasure pointers 220 defined around the maximum phase error can also be generated to assist in error correction.

In the event that the maximum phase error is not well defined, or if the circuit for storing the maximum phase error of FIG. 7A is not employed, then an alternative method is to select an arbitrary location in the data segment 200 and to synchronize relative to that point. Then, during retry operations, the selected location can be adjusted until the data segment 200 is successfully recovered. For instance, the default may be to initially synchronize toward the center of the data segment 200, and then adjust the "error" location left and right from the center during retry operations.

The above "split segment" synchronization technique of the present invention applies to a sector format that includes multiple secondary sync marks (FIG. 4C) or only one secondary sync mark at the end of the sector (FIG. 4D). That is, the data segment 200 of FIG. 8A and 8B may be one segment of multiple segments, or it may be the entire sector.

TA Detector

In addition to providing secondary sync marks to protect against a thermal asperity (TA) corrupting byte synchronization, the present invention provides a TA detector 102 within the read channel of FIG. 2 which detects and directly compensates for the deleterious effect a TA has on the sample sequence. Further, the TA detector 102 generates erasure pointers 6 to assist the ECC system of FIG. 1 in correcting the part of the estimated data sequence corrupted by a TA.

Prior art methods are known that directly compensate for TA errors. For example, Richard L. Glaberaith et al. disclose such a method in U.S. Pat. No. 5,233,482 entitled, "Thermal Asperity Compensation For PRML Data Detection." The method disclosed therein comprises the steps of: sampling the analog read signal using and analog-to-digital converter (ADC); detecting when the ADC samples saturate which indicates the occurrence of a TA; elevating a pole of an AC coupling capacitor; holding the timing recovery and gain control loops at a state just before the TA occurred; and adjusting the headroom of the ADC and the target settings of a sequence detector. When the effect of the TA dissipates, the ADC and sequence detector are re-adjusted to their normal operating setting.

Figure 9A:
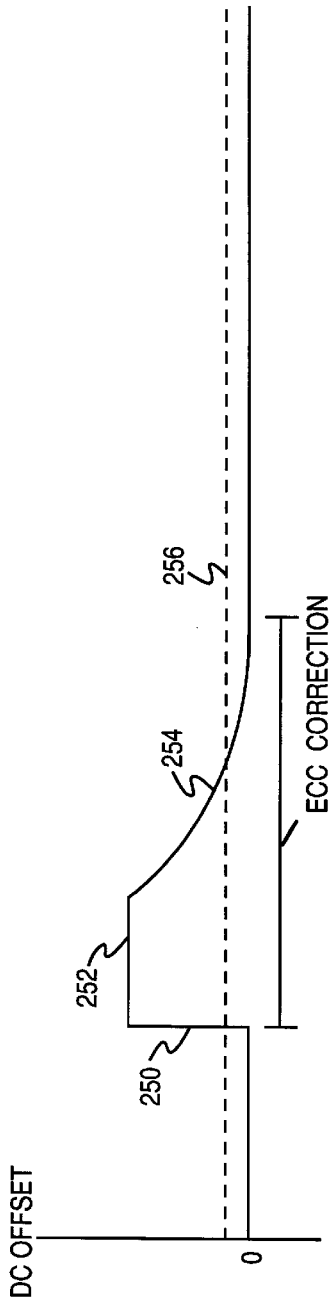
FIG. 9A shows the effect on of a thermal asperity on the analog read signal without compensation.
Figure 9B:
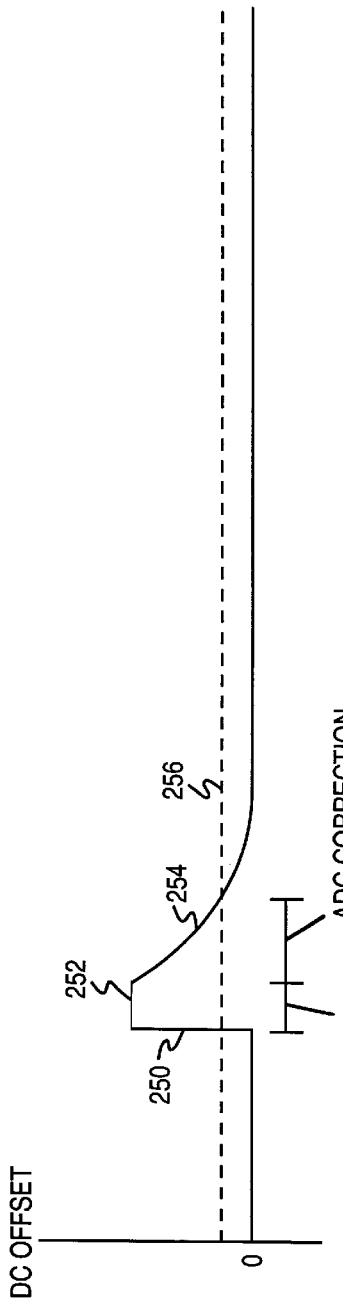
FIG. 9B shows the effect on the DC offset of the analog read signal when thermal asperities are compensated for using a prior art TA compensation technique.

FIG. 9B illustrates the affect of the TA compensation method described in the above '482 patent. Elevating the pole of the AC coupling capacitor reduces the TA time constant causing the DC offset to decay faster to a tolerable operating range 256, thereby decreasing the total number of data symbols corrupted by the TA. While the ADC samples are saturated 252, the data symbols corrupted by TA errors are detected and corrected by the ECC circuitry. When the ADC samples come out of saturation and begin to decay 254 toward the tolerable operating range 256, the head room of the ADC is increased by decreasing the signal gain by half. In other words, during the time the ADC samples are decaying 254, they are scaled to fit within the tolerable operating range of the read channel. In this manner, the read channel can accurately detect most of the digital data rather than rely on more complex and costly ECC circuitry that requires more redundancy.

There are problems associated with the above method for TA compensation. Namely, increasing the ADC headroom by decreasing the signal gain results in an increased number of soft errors due to the DC offset and decrease in ADC resolution (i.e., quantization noise). Often times the number of soft errors will exceed the error correction capability of the ECC circuitry. In this event, the read channel must wait for the disk to make a revolution and try to read the data again. This process repeats until hopefully the number of soft errors is within the error detection and correction capability of the ECC circuitry. However, multiple rereads increases the overall access time, an extremely undesirable effect. Furthermore, at the end of the TA compensation, when the signal gain is increased and the headroom of the ADC re-adjusted back to its normal operating range, a transient occurs which can introduce still more soft errors which decreases the likelihood of successful random ECC error correction.

Figure 9C:
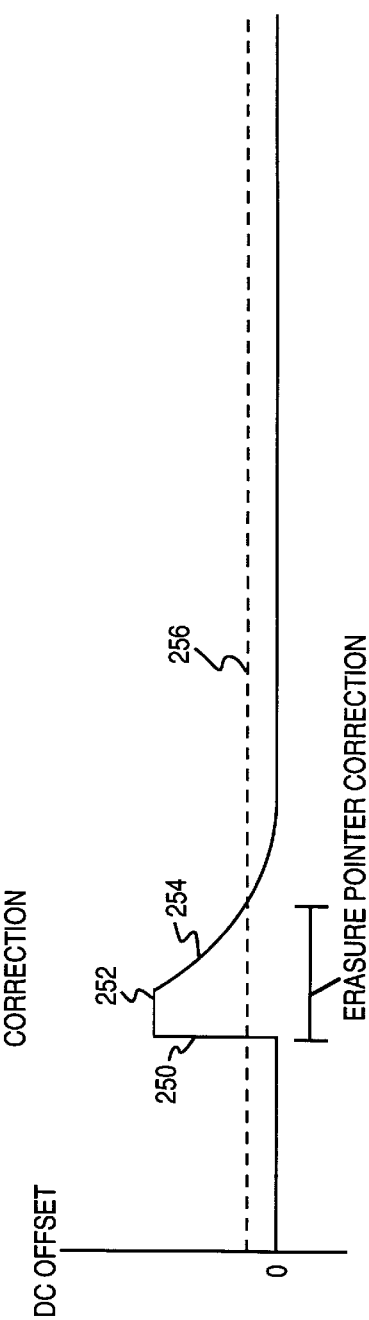
FIG. 9C shows the present invention TA erasure pointer technique which compensates for TA errors on-the-fly without increasing soft errors as compared to the prior art technique of FIG. 9B.
Figure 10:
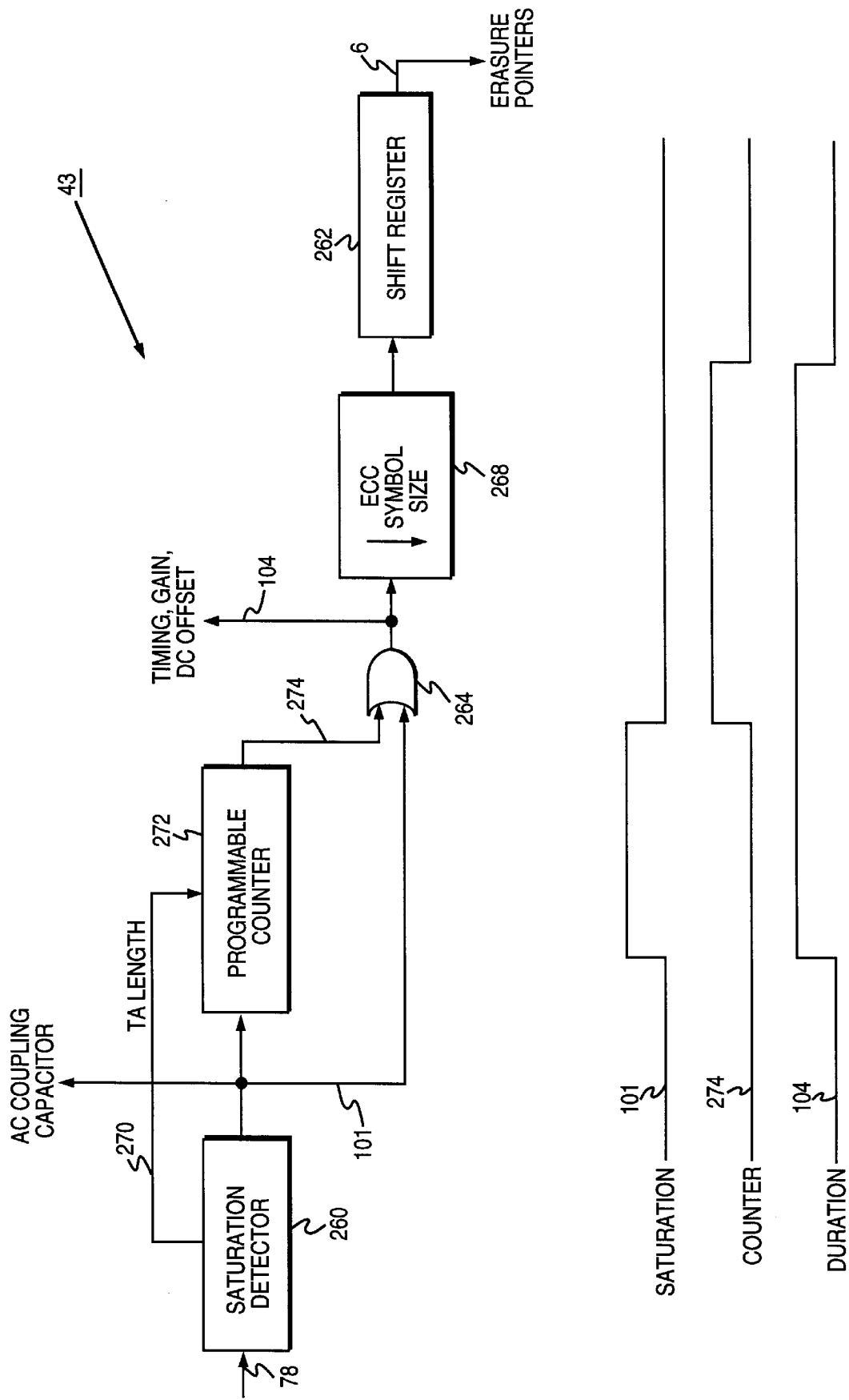
FIG. 10 illustrates details of the present invention's TA detection circuit which detects the occurrence of a thermal asperity.

Referring now to FIG. 10, shown are the details of the TA detector of the present invention and a corresponding timing diagram. A saturation detector 260 monitors the A/D sample values 78 and, when it detects a saturation condition 82 (as shown in FIG. 9C), it generates a control signal 101 for elevating the pole of the AC coupling capacitor 54 and begins shifting "1" bits into a shift register 262 through an OR gate 264 and an ECC symbol size decimation circuit 268. A programmable number of sample periods after the A/D 70 comes out of saturation 256, the saturation detector 260 resets the pole of the AC coupling capacitor 54, loads a TA LENGTH value over line 270 into a programmable counter 272, and enables the counter 272. The TA LENGTH 270 determines the duration of the thermal asperity (in sample periods) and is proportional to the number of sample periods the A/D 70 is saturated (which is a function of the magnitude of the TA and the data rate of the current zone). The output 274 of the counter is input into the OR gate 264 to continue shifting "1" bits into the shift register 262 for each ECC symbol corrupted by the TA. A hold signal 104 at the output of the OR gate 264 holds the timing recovery 62, gain control 82, and the DC offset 51 loops of FIG. 2 constant during the duration of the thermal asperity. When the counter 272 reaches terminal count, the gain control, timing recovery and DC offset loops are re-activated.

Before detecting a thermal asperity, the content of the shift register 262, which comprises a number of single bit delay/storage elements, is cleared. The length of the shift register 262 is sufficient to store the number of symbols corrupted by the TA (i.e., the duration of the TA in sample periods divided by the ECC symbol size) and a predetermined number of additional delay/storage elements in order to synchronize the output of the shift register 262 (a "1" bit output represents an erasure pointer 6) to the output 4 of the RLL decoder 94. That is, the erasure pointers are delayed so that they are correctly aligned with the corresponding corrupted ECC symbols input into the syndrome generator 20 of FIG. 1.

ECC System Overview

The data to be stored onto the disk is processed to obtain additional data symbols (called check symbols or redundancy symbols). The redundancy symbols are normally generated by dividing a sector of data by a codeword generator polynomial, where the division operation is typically carried out using a linear feedback shift register (LFSR) in the redundancy/syndrome generator 20 of FIG. 1. The data and check symbols together make up a codeword (i.e., a complete sector) written to the disk via the PRML read channel 2. When reading from the disk via the PRML read channel 2, the codeword is processed by the redundancy/syndrome generator 20 of to obtain error syndromes which contain information about locations and values of errors.

The Reed-Solomon codes are a class of multiple-error correcting codes. One of the most popular methods of decoding is to generate the error locator polynomial σ(x) [i.e the connection polynomial using the Berlekamp-Massey algorithm]; generate the error evaluator polynomial ω(x) from the error locator polynomial; perform a root search for the error locator polynomial to detect error locations; and then evaluate the error evaluator polynomial at the error locator polynomial root to calculate an error value.

Most logic circuits for error detection and correction implement the Berlekamp-Massey algorithm. Each iteration of the Berlekamp-Massey algorithm has two parts or stages:

$$\text{calculate } d_n: d_n = \Sigma \sigma_k S_{n-k} \quad (1)$$

$$\text{update } \sigma: \sigma^{(n+1)}(x) = \sigma^{(n)}(x) - d_n d_r^{-1} x \tau^{(n)}(x) \quad (2)$$

$$\text{update } \tau: \tau^{(n+1)}(x) = x \tau^{(n)}(x) \text{ or } \sigma^{(n)}(x)$$

As used herein, $d_n$ is a discrepancy number and τ is an intermediate polynomial used in calculating. The choice of the two alternate expressions for τ depends on whether or not the σ(x) update results in an increase in the order of σ(x). When an increase results, τ(x) is set to σ(x) and $d_r$ is set to $d_n$. If τ(x) is instead set to $d_n^{-1} x \sigma(x)$, then $d_r$ can be eliminated and the recursions become:

EQUATIONS 1 calculate $d_n$: $d_n = \Sigma \sigma_k S_{n-k}$ (1)

update $\sigma$: $\sigma^{(n+1)}(x) = \sigma^{(n)}(x) - d_n d_r \tau^{(n)}(x)$ (2)

update $\tau$: $\tau^{(n+1)}(x) = x\tau^{(n)}(x)$ or $\tau^{(n+1)}(x) = d_n^{-1} x \sigma^{(n)}(x)$ and $d_r = d_n$ The second stage requires the result of the first stage. To minimize circuitry size it is desirable to perform all arithmetic in a serial manner and to make updates in a serial manner (as opposed to a parallel manner requiring space-consuming parallel buses). Assuming the field used is $GF(2^m)$, the minimum number of clock cycles needed for a serialized implementation is 2m clocks per iteration, i.e. m clocks per stage.

U.S. Pat. No. 4,845,713, issued Jul. 4, 1989 to Zook, shows a method which uses 2m+1 clocks per iteration and bit-serial multipliers and adders. However, it uses 4t+1 m-bit registers and a $2^m \times m$ ROM look-up table for inversion (t being the number of correctable errors). Also, the update for $\tau(n+1)$ (x) is done in a parallel manner.

Various decoding methods are described in Whiting's PhD dissertation for the California Institute of Technology entitled "Bit-Ser. Reed-Solomon Decoders in VLSI," 1984. Whiting's preferred implementation uses the following modified set of recursion equations:

EQUATIONS 2 calculate $d_n$: $d_n = \Sigma \sigma_k S_{n-k}$ (1)

update $\sigma$: $\sigma^{(n+1)}(x) = \sigma^{(n)}(x)$ or $\sigma^{(n+1)}(x) = d_n^{-1} \sigma^{(n)}(x) - x\tau^{(n)}(x)$ (2)

update $\tau$: $\tau^{(n+1)}(x) = x\tau^{(n)}(x)$ or $\tau^{(n+1)}(x) = d_n^{-1} \sigma^{(n)}(x)$ Whiting's implementation can perform an iteration in 2m clocks if a $2^m \times m$ ROM look-up table is used for inversion. The updates can be done serially, but $d_n^{-1}$ must be parallel bussed to each multiplier. Whiting's overall implementation would use 5(t+1) m-bit registers. The reason that the number of registers is proportional to t+1 instead of t is because $\sigma_0$ is not identically equal to 1, i.e. the $\sigma(x)$ generated by EQUATIONS 2 is the $\sigma(x)$ generated by EQUATIONS 1 multiplied by some constant. Whiting also mentions using the following modified set of recursion equations:

EQUATIONS 2A calculate $d_n$: $d_n = \Sigma \sigma_k S_{n-k}$ (1)

update $\sigma$: $\sigma^{(n+1)}(x) = d_r \sigma^{(n)}(x) - x d_n \tau^{(n)}(x)$ (2)

update $\tau$: $\tau^{(n+1)}(x) = x\tau^{(n)}(x)$ or $\tau^{(n+1)}(x) = \sigma^{(n)}(x)$ Whiting's second method uses no inversions, but for serial updates it requires 6(t+1)+2 m-bit registers and $d_n$ and $d_r$ must be parallel bussed to each multiplier.

All known implementations for the Berlekamp-Massey algorithm use some combination of a $2^m \times m$ ROM, symbol-wide signal paths, and an excessive number of m-bit registers in order to perform an iteration in 2m clock cycles. An inherent problem with all of the above sets of iteration equations is that $\sigma^{(n+1)}(x)$ depends on $\tau^{(n)}(x)$ and, in turn, $\tau^{(n+1)}(x)$ depends on $\sigma^{(n)}(x)$. Since one or both of them depend upon $d_n$, consequentially $d_n$ must be calculated during the first m clock cycles and then $\sigma^{(n+1)}(x)$ and $\tau^{(n+1)}(x)$ must both be calculated during the second m clock cycles. This implies the need for temporary storage for one or both of $\sigma^{(n)}(x)$ and $\tau^{(n)}(x)$ when used in multiplications to produce $\sigma^{(n+1)}(x)$ or $\tau^{(n+1)}(x)$. Thus there is a need for a more efficient method.

The Reed-Solomon decoder of the present invention processes a codeword containing n m-bit symbols to determine coefficients of an error locator polynomial $\tau(x)$, and thereafter generates an error evaluator polynomial $\omega(x)$. The decoder comprises a bank of syndrome registers for storing syndrome values; a bank of error locator registers for accumulating therein coefficients of an error locator polynomial $\sigma(x)$; a bank of intermediate registers for accumulating therein coefficients of an intermediate polynomial $\tau(x)$. The decoder further includes a register update circuit which, for a given codeword, conducts t number of error locator iterations in order to update values in the error locator registers and the intermediate registers. Each error locator iteration includes two phases, specifically a first phase or phase A and a second phase or phase B. Each phase comprises m clock cycles. Upon completion of the error locator iterations, two-phased error evaluator iterations are conducted to determine coefficients of the error evaluator polynomial $\omega(x)$ which are stored in the intermediate registers.

In contrast to prior art techniques wherein coefficients of the error locator polynomial $\sigma(x)$ and coefficients of the intermediate polynomial $\tau(x)$ are both updated during the same phase (e.g., the second phase of an error locator iteration), the register update circuit of the present invention updates coefficients of the intermediate polynomial $\tau(x)$ during the first phase of each error locator iteration, and updates coefficients of the error locator polynomial $\sigma(x)$ during the second phase of each error locator iteration. A current discrepancy value $d_n$, required for updating the coefficients of the error locator polynomial $\sigma(x)$, is also obtained during the first phase of each error locator iteration.

The decoder of the present invention thus implements the following recursion rules:

PHASE A update $\tau$: $\tau^{(n)}(x) = x\tau^{(n-1)}(x)$ or $\tau^{(n)}(x) = x(\tau^{(n-1)}(x) + d_{n-1}^{-1} \sigma^{(n)}(x))$ calculate $d_n$: $d_n = \Sigma \sigma_k S_{n-k}$

PHASE B update $\sigma$: $\sigma^{(n+1)}(x) = \sigma^{(n)}(x) - d_n \tau^{(n)}(x)$ The register update circuit includes a discrepancy determination circuit for determining, during the first phase of each error locator iteration, the current discrepancy $d_n$. The discrepancy determination circuit adds multiplicative products from a plurality of "slices" to obtain the current discrepancy $d_n$. Each slice comprises one of the syndrome registers, one of the error locator registers, one of the intermediate registers, and one modified syndrome register.

The multiplicative product of each slice is generated by a discrepancy-generating inner product generator circuit. The discrepancy-contributing inner product generator circuit of a slice takes the inner product of the modified syndrome register of the slice (in second or $\beta$ basis representation) and the contents of the intermediate register of the slice (in first or $\alpha$ basis representation). The product of two elements of $GF(2^m)$, where one element is represented in the standard or $\alpha$ basis and one element is represented in the dual or $\beta$ basis, can be produced serially, i.e. one output bit per clock, by taking the inner product of the two elements and multiplying one of the elements by $\alpha$ on each clock. Thus, in connection with the inner product generated by the discrepancy-contributing inner product generator circuit, the modified syndrome register initially receives the syndrome value of its corresponding syndrome register, but is updated to contain an α-multiple of the syndrome value by virtue of a multiplier feedback circuit connected around each modified syndrome register. Thus, each multiplicative product (i.e., the multiplicative product produced by a slice) is derived from a first term (the coefficient of the error locator register of the slice) and a second term (an α-multiple of the syndrome value of the slice [the α-multiple being stored in the modified syndrome register]). These first and second terms are multiplied by the discrepancy-contributing inner product circuit included in the slice.

The register update circuit also includes a discrepancy inversion circuit which determines an inverse of the current discrepancy (i.e., $d_n^{-1}$) in first basis representation. This inverse becomes the inverse of a prior discrepancy (i.e., $d_{n-1}^{-1}$ in an immediately succeeding error locator iteration). The discrepancy inversion circuit does not utilize a ROM-stored look up table, but instead serially receives the discrepancy in the second basis representation and generates its inverse.

The register update circuit also includes a discrepancy register DM which selectively has stored therein the inverse of the prior discrepancy (i.e., $d_{n-1}^{-1}$) during the first phase of each error locator iteration and the current discrepancy ($d_n$) during the second phase of each error locator iteration. Both the inverse of the prior discrepancy (i.e., $d_{n-1}^{-1}$) and the current discrepancy ($d_n$) are stored in the discrepancy register in first basis (i.e., α basis) representation, the prior discrepancy (i.e., $d_{n-1}^{-1}$) having been generated in the first basis representation by the discrepancy inversion circuit and the current discrepancy ($d_n$) having been converted from second basis (i.e., β basis) representation to first basis representation by a conversion circuit for converting $d_n$ from a second basis representation to a first basis representation.

The register update circuit also includes an updating multiplier or inner product circuit which, during the first phase of each error locator iteration, selectively multiplies a value derived from the inverse of the prior discrepancy ($d_{n-1}^{-1}$), e.g., an α-multiple of $d_{n-1}^{-1}$ [stored in the discrepancy register during the first phase of the error locator iteration] by the coefficients in the error locator registers to obtain values for use in updating the coefficients stored in the intermediate registers. Thereafter (e.g., during the second phase of each error locator iteration), the updating multiplier circuit multiplies a value derived from the current discrepancy $d_n$, e.g., an α-multiple of $d_n$ [stored in the discrepancy register during the second phase of the error locator iteration] by the coefficients in the intermediate registers to obtain values for updating the coefficients stored in the error locator registers. The α-multiple of the current discrepancy $d_n$ is obtained by a multiplier feedback circuit connected to the discrepancy register for repetitively multiplying the value in the discrepancy register by the field element.

Importantly, in contrast to prior art techniques, the decoder of the present invention requires only one bank of error locator registers and one bank of intermediate registers. Prior art techniques of necessity included two banks of error locator registers: a first bank for maintaining the updated (new) coefficients of the error locator polynomial and a second bank for storing the old coefficients of the error locator polynomial (which were used to update the coefficients of the intermediate polynomial). Similarly, the prior art technique employed two banks of intermediate registers: a first bank for maintaining the new (updated) coefficients of the intermediate polynomial and a second bank for storing the old coefficients of the intermediate polynomial (which were used to update the coefficients of the error locator polynomial). Thus, the decoder of the present invention advantageously eliminates two banks of registers. In addition, the decoder of the present invention facilitates serial data shifting rather than parallel data transfer, thereby reducing circuit real estate which would otherwise be increased by parallel bus structure.

Reed-Solomon Decoder

Referring again to FIG. 1, a decoder circuit 22 receives t m-bit syndromes from a syndrome generator 20 and m-bit erasure location values from an erasure location value generator 16 over line 7. In addition, the operation of the decoder circuit 22 is sequenced by signals applied thereto by a timer/controller 18. After a series of error locator iterations, the decoder circuit 22 obtains final values for the t m-bit coefficients of the error locator polynomial. Upon completion of the series of error locator iterations for a codeword, the decoder circuit 22 executes a series of error magnitude iterations to generate an error evaluator polynomial for the codeword. The coefficients of the error evaluator polynomial are transmitted to a root search and error/erasure magnitude generator 14 where an error/erasure magnitude E is calculated. After calculating the error/erasure magnitude E, it is added to the original data at adder 24, resulting in the corrected byte. In the buffering scheme herein illustrated, the corrected byte is then returned to the data buffer 10.

The product of two elements of $GF(2^m)$, where one element is represented in the standard (or α basis) and one element is represented in the dual (or β basis), can be produced serially, i.e. one output bit per clock, by taking the inner product of the two elements and multiplying one of the elements by α on each clock. Accordingly, as used herein, such values as the syndromes, the current discrepancy $d_n$, and the prior discrepancy $d_{n-1}$ are represented in the α basis while such values as the coefficients of σ(x) and τ(x) are represented in the β basis. Such representation allows all of the multiplications of EQUATIONS 3 (hereinafter discussed) to be performed serially using inner products.

Figure 11:
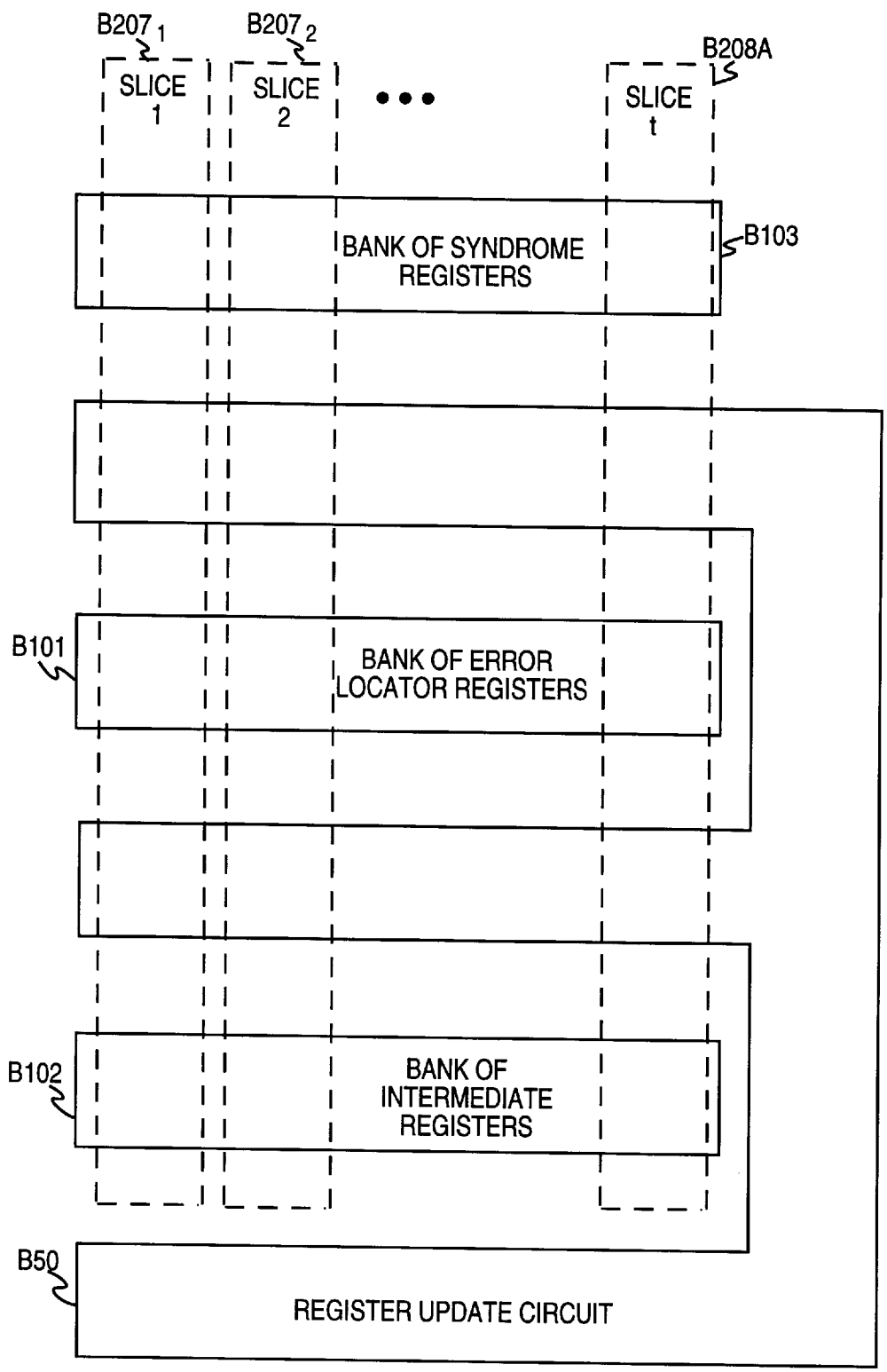
FIG. 11 shows an overview of the error correction system of FIG. 1.

FIG. 11 is a block diagram of decoder circuit 22 generally. Decoder circuit 22 comprises a bank B101 of error locator or σ registers; a bank B102 of intermediate or τ registers; a bank B103 of syndrome registers; and, a register update circuit B50. Details of differing embodiments of decoder circuit 22 are provided with respect to FIG. 12A and 12B. It will subsequently be seen that portions of decoder circuit 22 form a plurality of "slices" $B207_1$, $B207_2$, . . . $B207_{t-1}$, B208A. The slices are discussed in more detail below, particularly with reference to FIGS. 12A–12D.

Figure 12A:
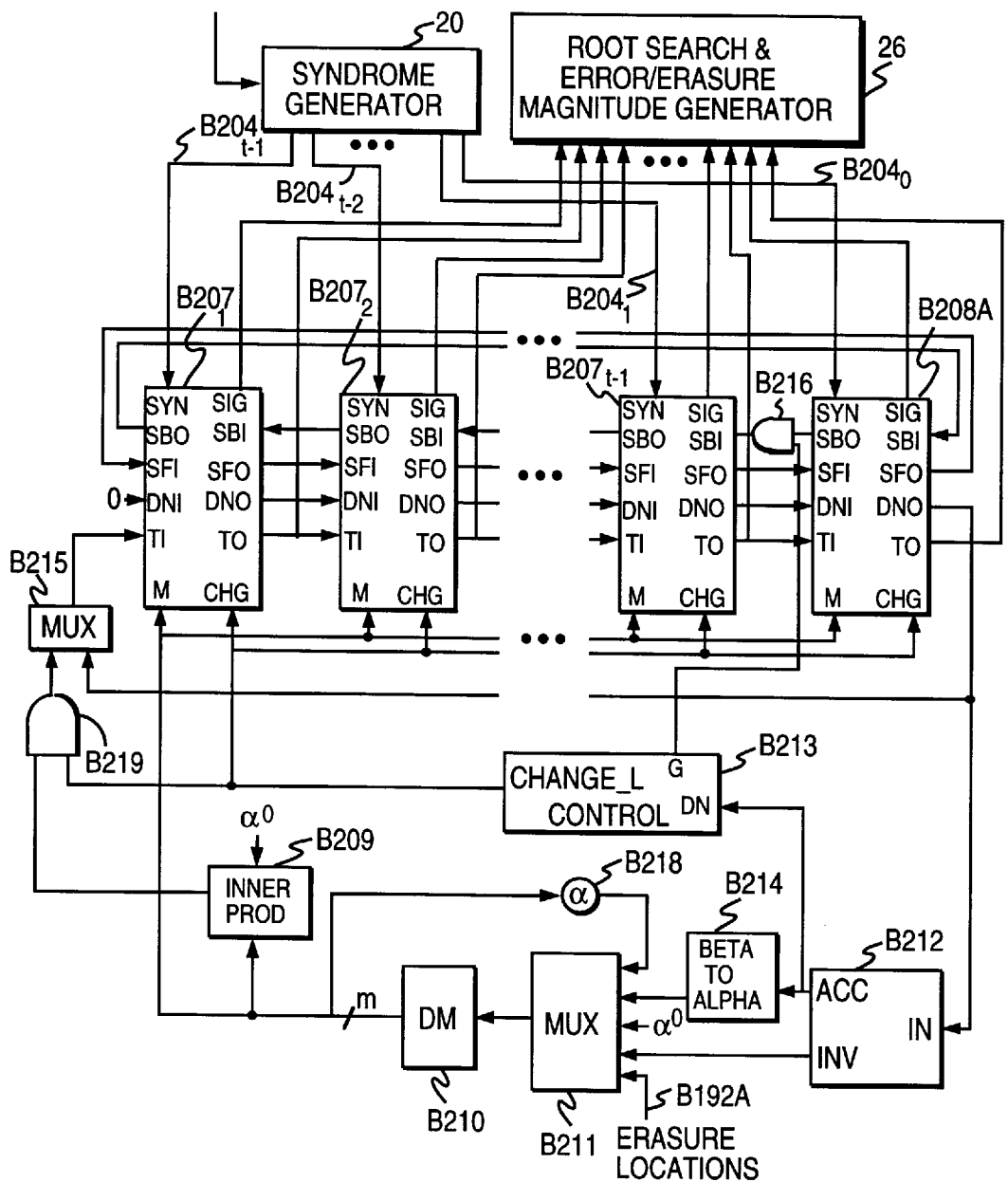
FIG. 12A shows a schematic view of a decoder circuit according to an embodiment of the invention (which operates in an errors and erasure mode) along with a syndrome generator and which incorporates erasure correction.
Figure 12B:
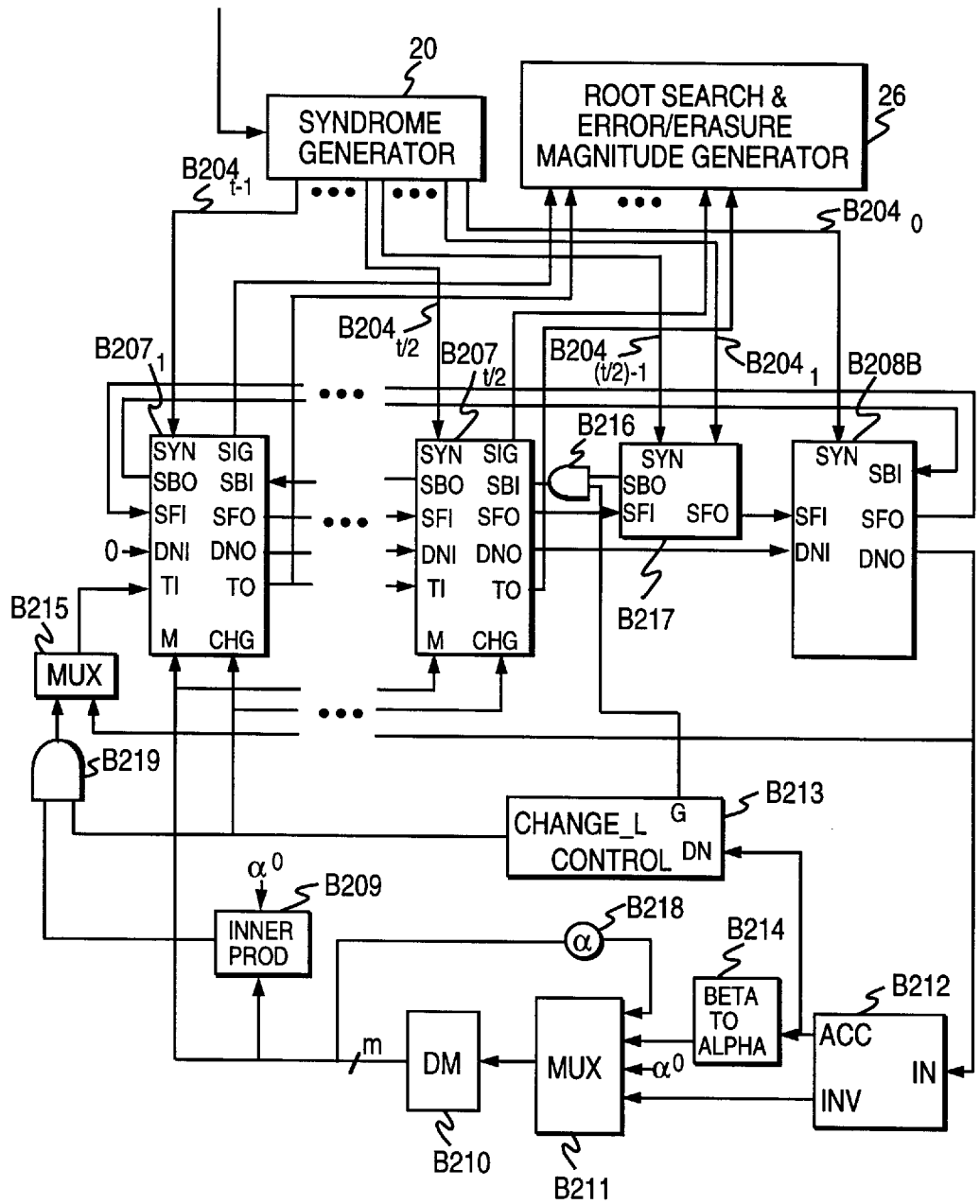
FIG. 12B is a schematic view of a decoder circuit according to an embodiment of the invention (which operates in an errors only mode) along with a syndrome generator and error/locator generator and which does not incorporate erasure correction.

Decoder circuit 22 operates in one of two modes: decoding of errors and erasures (errors and erasures mode), or decoding of errors only (errors only mode). FIG. 12A shows details of the decoder circuit for the errors and erasures mode, and FIG. 12B shows details of the decoder circuit for the errors only mode. Decoder circuit 22 of FIG. 12A can simultaneously correct u errors and v erasures (errors whose locations are known) as long as 2u+v is not greater than t.

FIG. 12A shows signals which are input to and output from slices $B207_k$ and B208A in an errors and erasures mode. These signals include the following m-bit signals:

SYN—syndrome data signal;
SBO—syndrome shifted backwards output signal;
SBI—syndrome shifted backwards input signal;
SFI—syndrome shift forward input signal;
SFO—syndrome shift forward output signal
TI—τ input signal TI;

TO—τ output signal TO;

M—discrepancy-related input signal M;

DNI—a one bit discrepancy-forming input signal input into each slice B207$_k$, B208A;

DNO—a one bit discrepancy-forming output signal output from each slice B207$_k$, B208A; and SIG—a one bit coefficient output line SIG connected from each slice to error locator generator B203 so that output from error locator register B101 can be serially outputted.

FIG. 12A shows some of the elements included in register update circuit B50 of FIG. 11. These elements include an inner product circuit B209; a discrepancy-related register DM B210; a DM register-controlling MUX B211; a discrepancy inversion circuit B212; a controller B213; a β to α basis conversion circuit B214; a TI input-controlling MUX B215; a zero backward fill AND gate B216; a multiplier feedback circuit B218; and a first slice τ-AND gate B219. Yet other elements included in register update circuit B50 include the non-register components of slices B207$_k$ and B208A, which are discussed below.

As shown in FIG. 12A, output signal DNO from slice B208A is applied both to an input of discrepancy inversion circuit B212 and to a first input pin of MUX B215. Discrepancy inversion circuit B212 has two m-bit output ports: a first output port labeled ACC, and a second output port labeled INV. As hereinafter described, a current discrepancy value $d_n$ (in β basis representation) is output from port ACC during the first phase of an error locator iteration. From port ACC the current discrepancy value $d_n$ is applied both to input pin DN of controller B213 and to β to α basis conversion circuit B214. Upon completion of a second phase of an error locator iteration, discrepancy inversion circuit B212 outputs an inverted value of the discrepancy ($d_n^{-1}$) determined during the first phase, which inverted value then becomes an inverted prior discrepancy (e.g., $d_{n-1}^{-1}$) during the first phase of the next iteration.

Figure 17:
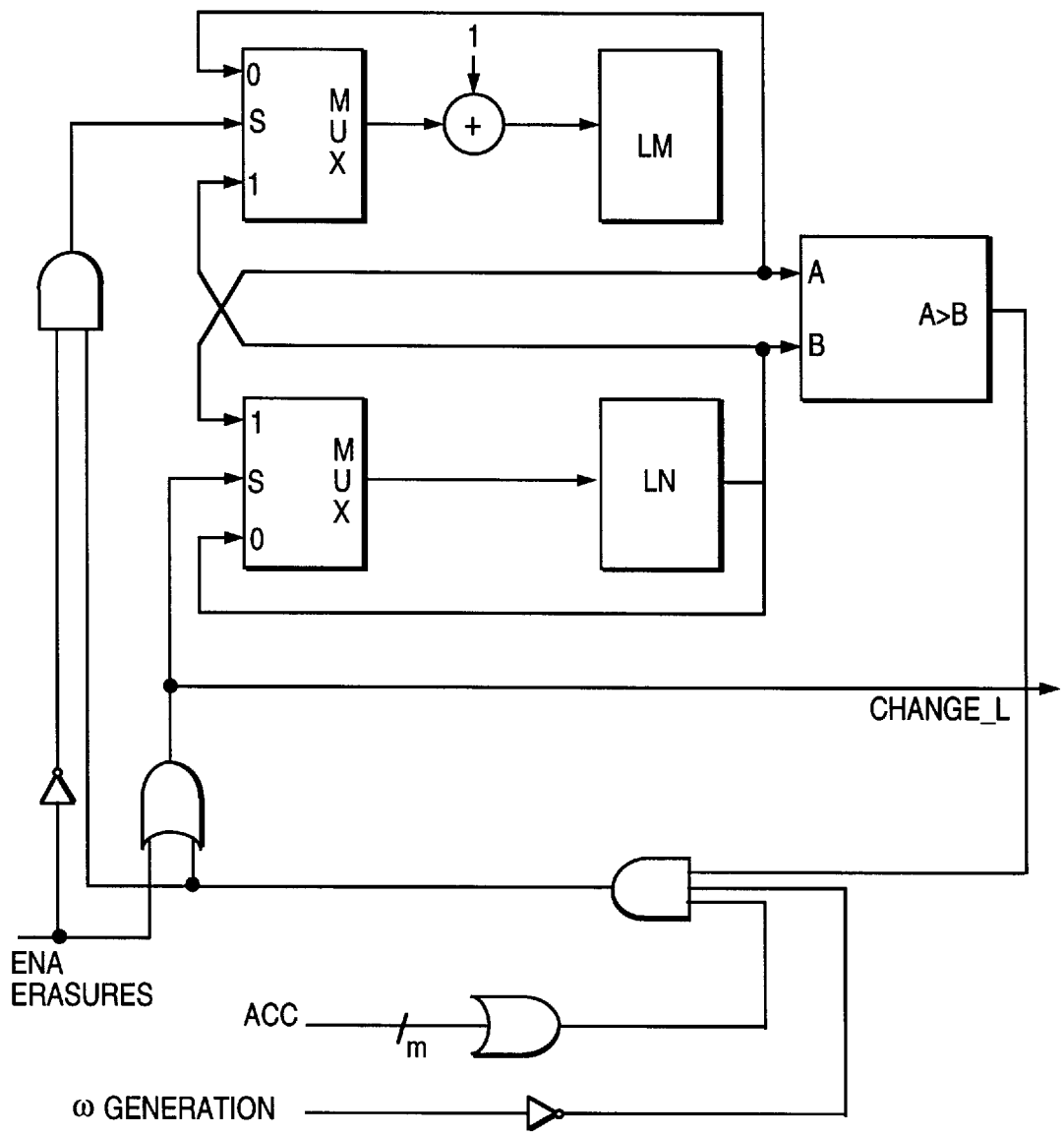
FIG. 17 is a schematic view of portions of a controller according to an embodiment of the invention.
Figure 18:
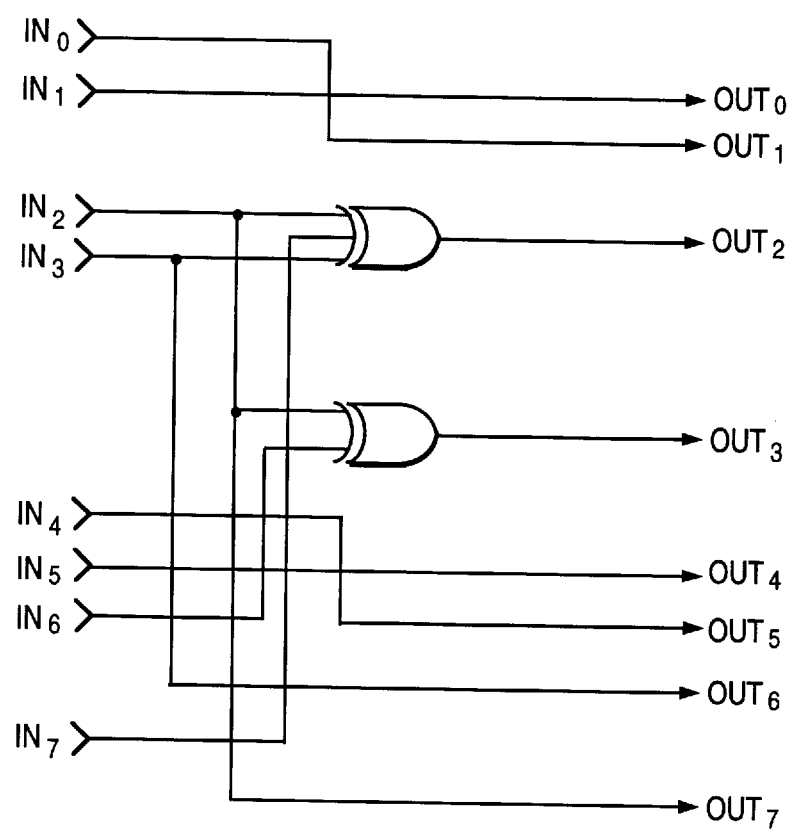
FIG. 18 is a schematic view of a circuit which translates from the dual (e.g., second) basis to the standard (e.g, first) basis.

Controller B213 uses the non-converted current discrepancy value $d_n$ obtained from circuit B212 to generate signals G and CHANGE_L in the manner depicted in FIG. 17. Signal CHANGE_L is applied to a first input pin of AND gate B219 and to slices B207$_k$ and B208A in the manner depicted in FIG. 13A, 13B and 13C. Signal CHANGE_L refers to a change in the length of the connection polynomial, which is understood by those skilled in the art.

DM-register controlling MUX B211 receives a plurality of selectable m-bit inputs, including the current discrepancy (in α-basis representation from basis conversion circuit B214); the inverted prior discrepancy $d_{n-1}^{-1}$ (from inversion circuit B212); the value $α^0$; erasure location values (from erasure location value generator B197); and, an α-multiple of the contents of DM register B210 (from multiplier feedback circuit B218). DM-register controlling MUX B211 is, in turn, controlled by timer/controller B198 which selects among the possible inputs in accordance e.g. with the iteration phase.

An output port of DM-register controlling MUX B211 is connected to an input port of DM register B210. An output port of DM register B210 is connected to the multiplier feedback circuit B218; to a first input of inner product circuit B209; and to slices B207$_k$ and B208A in the manner illustrated by FIGS. 11A and 11B. Inner product circuit B209 receives $α^0$ as a second input and generates an output signal for application to a second pin of first slice τ-AND gate B219.

The errors only decoding circuit of FIG. 12B differs slightly from the errors and erasures decoding circuit of FIG. 12A. In particular, for the errors only mode of FIG. 12B, slices B207$_{(t/2)-1}$ through B207$_{t-1}$ form a collective slice circuit B217 and DM-register controlling MUX B211 does not receive erasure location values.

It is understood from FIG. 11 and 12A, for example, that decoding circuit B199 comprises t number of slices, in particular nominal slices B207$_k$ and terminator slice B208A. Slices B207 and B208A are connected together in the manner shown in FIG. 12A for the errors and erasures mode and in the manner shown in FIG. 12B for the errors only mode. In both modes, slice $B^{207}{}_k$ is representative for slice k for k=1,2, . . . ,t–1 and B208A represents slice t.

Figure 13A:
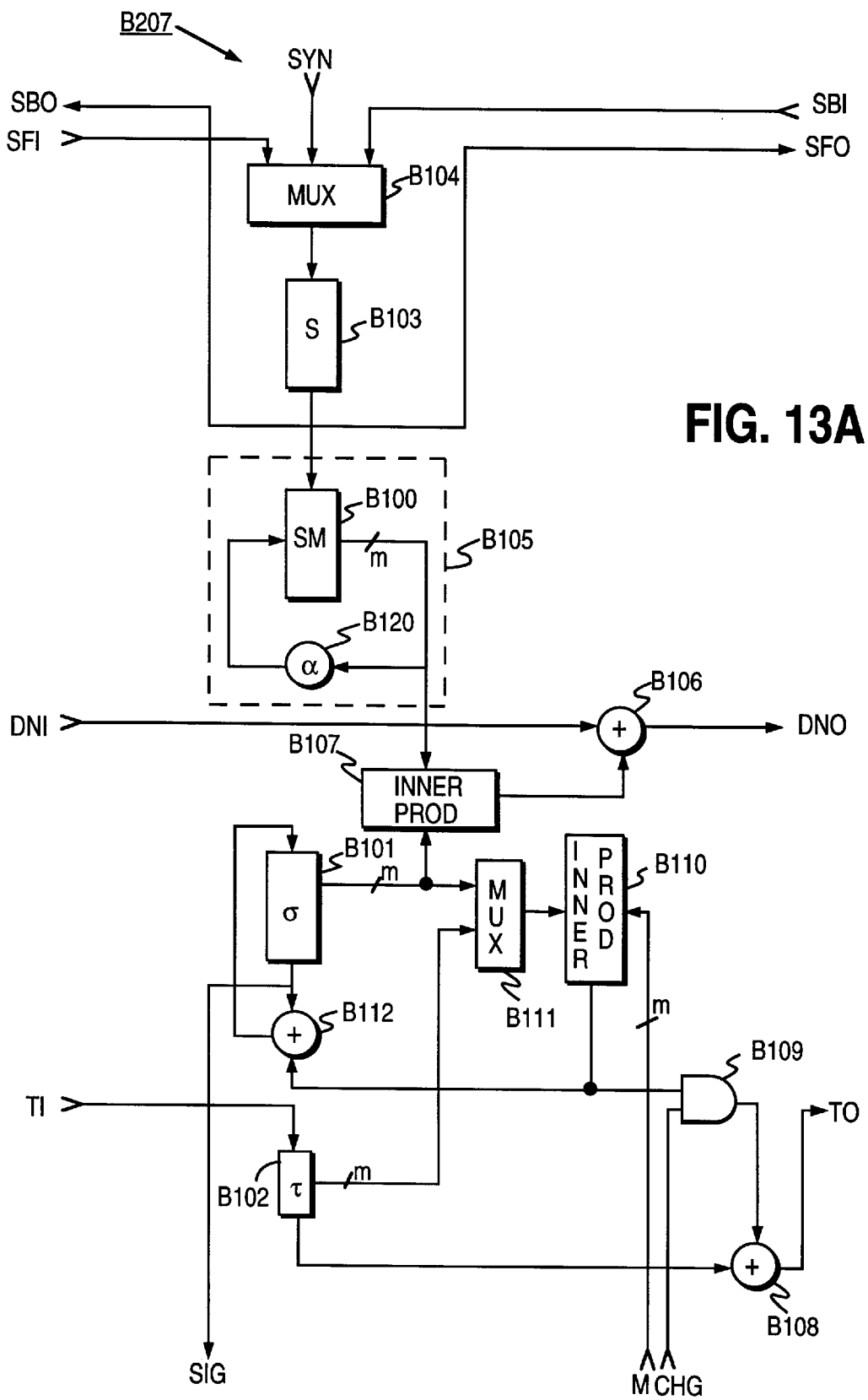
FIG. 13A is a schematic view of a slice of a decoder circuit (errors and erasures mode) according to an embodiment of the invention.
Figure 13B:
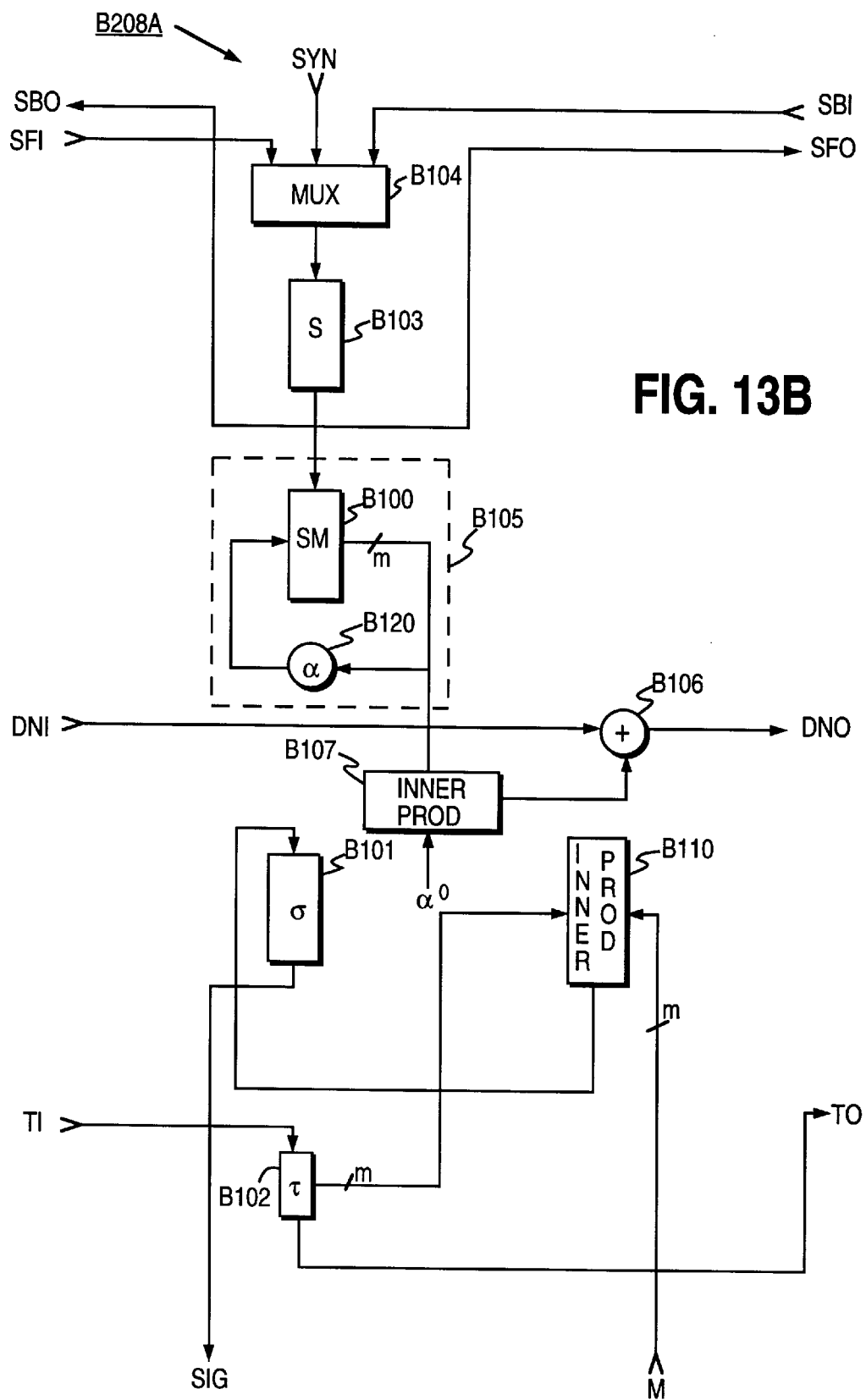
FIG. 13B is a schematic view of a terminal slice of a decoder circuit (errors and erasures mode) according to an embodiment of the invention.
Figure 13C:
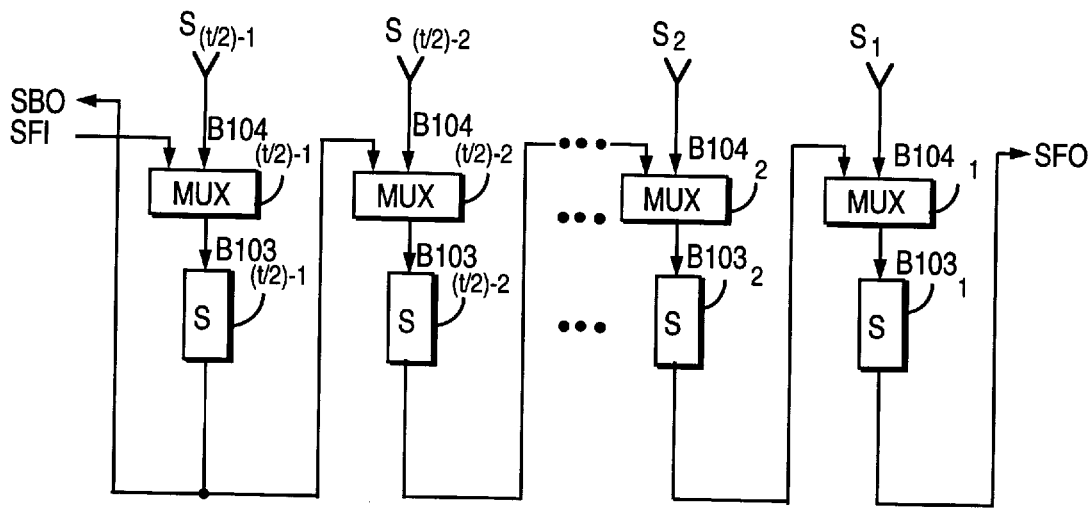
FIG. 13C is a schematic view of a collective slice circuit of a decoder circuit (errors only mode) according to an embodiment of the invention.
Figure 13D:
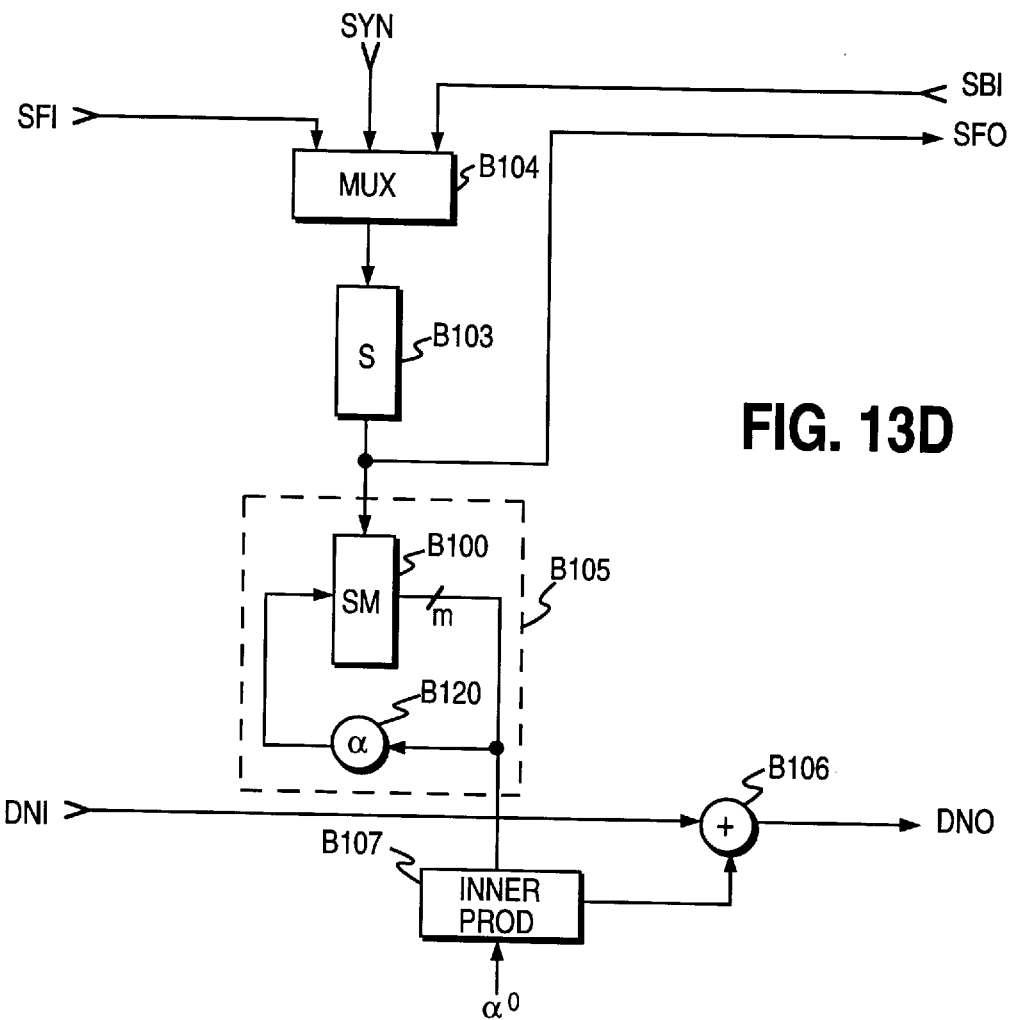
FIG. 13D is a schematic view of a terminal slice of a decoder circuit (errors only mode) according to an embodiment of the invention.

FIG. 13A shows details of slices B20$^7$k for the errors and erasure mode and FIG. 13B shows details of slice B208A for the errors and erasures mode. In the errors only mode of FIG. 12B, slice B207$_1$ through and including slice B207$_{t/2}$ are identical to the slices B207$_k$ illustrated in FIG. 13A. However, for the errors only mode, slices B207$_{(t/2)-1}$ through B207$_{t-1}$ form the collective slice circuit B217, shown in FIG. 13C, and slice 208B is as shown in FIG. 13D.

FIG. 13A shows that slices $B^{207}{}_k$ comprise registers B101, B102, and B103. As also shown in FIG. 13A, syndrome register B103 is loaded via a MUX B104 with syndrome data either from syndrome generator 20 (signal SYN) or from a syndrome register in one of two adjacent slices (using either signal SFI or signal SBI). A select pin of MUX B104 is controlled by timer/controller B198 in accordance with iteration number, phase of iteration, and type of iteration. Error locator registers 101 and intermediate registers B102 are all initialized to zero.

Other components of slices B207$_k$ are included in register update circuit B50, in particular: modified-syndrome multiplication circuit B105; adder B106; discrepancy-contributing inner product circuit B107; adder B108; τ-output AND gate B109; an updating multiplier or inner product circuit B110; coefficient selecting-MUX B111; and adder B112. As with other MUXes described herein, coefficient selecting-MUX B111 is controlled by timer/controller B198 in accordance with iteration number, phase of iteration, and type of iteration.

A multiplicative product of each slice is generated by discrepancy-generating inner product generator circuit B107. Discrepancy-contributing inner product generator circuit B107 of a slice takes the inner product of the modified syndrome register B100 of the slice (in first or α basis representation) and the contents of the intermediate register B102 of the slice (in second or β basis representation). The product of two elements of GF($2^m$), where one element is represented in the standard or α basis and one element is represented in the dual or β basis, can be produced serially, i.e. one output bit per clock, by taking the inner product of the two elements and multiplying one of the elements by α on each clock. Thus, in connection with the inner product generated by the discrepancy-contributing inner product generator circuit B107, the modified syndrome register B100 initially receives the syndrome value of its corresponding syndrome register B103, but is updated to contain an α-multiple of the syndrome value by virtue of multiplier feedback circuit B105.

Figure 14:
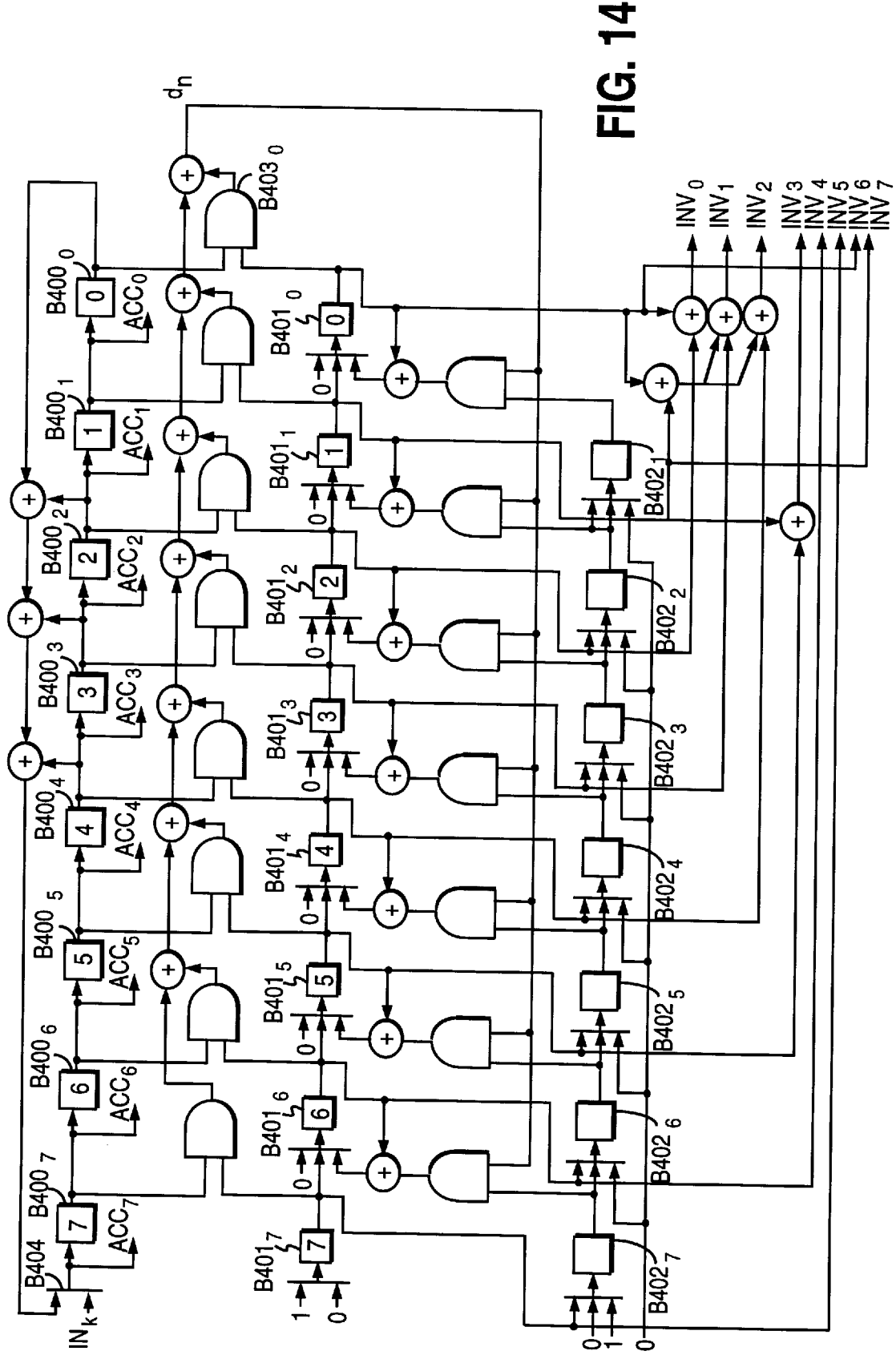
FIG. 14 is a schematic view of a circuit for calculating multiplicative inverses in $GF(2^8)$.

Output pins of error locator register B101 are connected both to a first port of inner product circuit B107 and to a first port of coefficient selecting-MUX B111. A second port of inner product circuit B107 is connected to modified-syndrome multiplication circuit B105. As shown in FIG. 13A, modified-syndrome multiplication circuit B105 includes a modified syndrome register B100 which receives a syndrome value from syndrome register B103 paired therewith. Modified syndrome register B100 has an α-multiple feedback circuit B120 connected thereto, such that the output of modified syndrome register B100 is an α-multiple of the syndrome value stored in register B103. FIG. 14 is a schematic diagram of details of modified-syndrome multiplication circuit B105 for the example field $GF(2^8)$.

During a first phase of each error locator iteration, inner product circuit B107 takes the inner product of the m-bit quantity $\sigma^{(n)}$ (from the error locator coefficient register B101) and the m-bit quantity which is α-multiple of the syndrome value stored in register B103 (from modified syndrome register B100) to produce a bit for application to adder B106. Adder B106 adds the resultant bit from inner product circuit B107 to a signal input (from an upstream slice) on line DNI to yield output signal DNO (for application to a downstream slice).

Coefficient selecting-MUX B111 has its second input port connected to an output port of the intermediate register B102. An output port of MUX B111 is connected to a first input port of inner product register B110. A second input port of inner product register is connected by line M to DM register B210 in the manner already described. An output port of inner product register B110 is connected both to a first input pin of AND gate B109 and to a first input of adder B112. An output port of adder B112 is connected to an input port of error locator register B101. A serial output port of error locator register B101 is connected both to a second input of adder B112 and by serial line SIG to root search and error/erasure magnitude generator 26 (see FIG. 12A). A second output port of intermediate register B102 is connected to a first input port of adder B108. A second input port of adder B108 is connected to an output port of AND gate B109. AND gate B109 has its first input port connected to the output port of inner product circuit B110 and its second input port connected by line CHANGE_L to controller B213 in the manner already described.

Slice B208A of FIG. 13B (errors and erasures mode) differs slightly from slices B207$_k$, as appears from a comparison of FIG. 13A (slices B207$_k$) and FIG. 13B (slice B208A). In particular, in slice B208A, MUX B111, adder B108, AND gate B109, and adder B112 are eliminated. The output port of error locator register B101 is connected only to coefficient output line SIG. The discrepancy-contributing inner product circuit B107 of slice B208A receives the value $\alpha^0$ at its first port and has its second port connected to modified-syndrome multiplication circuit B105. Inner product circuit B110 has its input port connected to the output port of the intermediate register B102. The output of inner product circuit B110 is connected only (and directly) to the input port of locator coefficient register B101. The output port of intermediate register B102 is connected to line TO.

Slice B208A of FIG. 13D (errors only mode) differs from slice B208A of FIG. 13B (errors and erasures mode) by elimination of locator coefficient register B101, intermediate coefficient register B102, and inner product circuit B110.

The structure of discrepancy inversion circuit B212 of FIG. 12A and 12B is understood from the above referenced U.S. Pat. No. 5,467,297 entitled "FINITE FIELD INVERSION", which is incorporated herein by reference.

Figure 15:
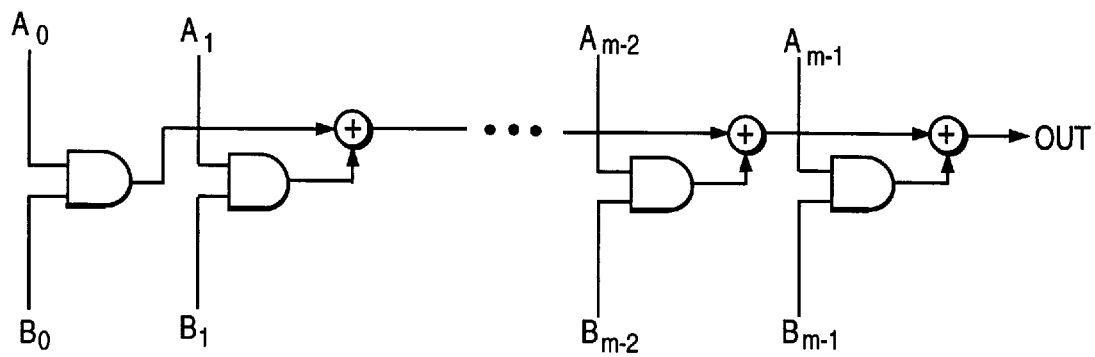
FIG. 15 is a schematic view of an inner product generator circuit.
Figure 16:
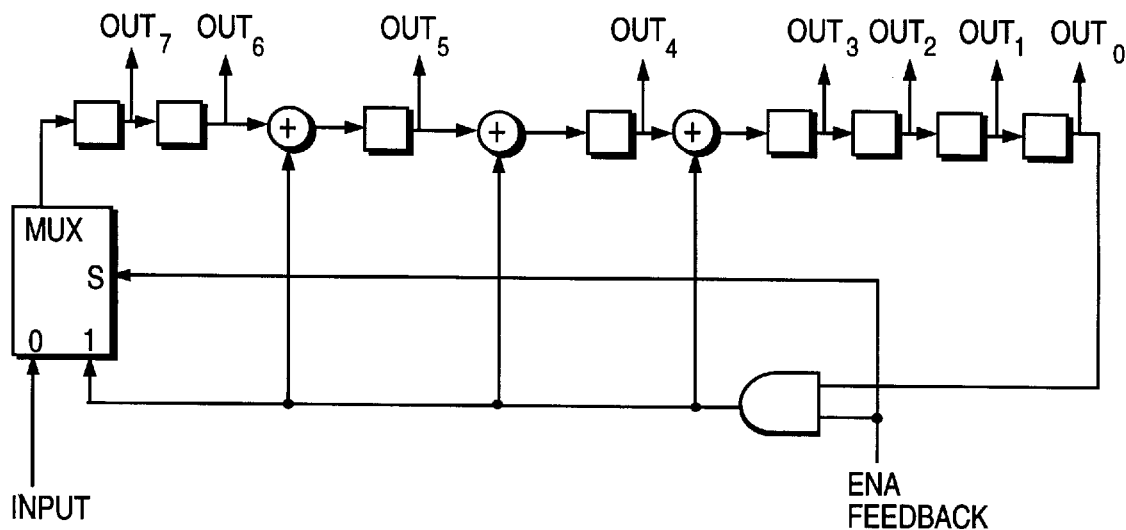
FIG. 16 is a schematic view of a modified-syndrome multiplication circuit according to an embodiment of the invention.

FIG. 15 shows a schematic diagram of inner product generator circuit B107 of FIG. 13A, 13B and 13D for one illustrative exampleof the invention. In the illustrative example of FIG. 15, it is assumed that the field is $GF(2^8)$ with field generator $x^8+x^4+x^3+x^2+1$. As taught in the above '297 U.S. Patent, the β representation of an element is governed by the choice for $\alpha_0$. For the illustrative example it is assumed that $\alpha_0$ is $\alpha^{-4}$.

Decoder Operation: Overview

Figure 19:
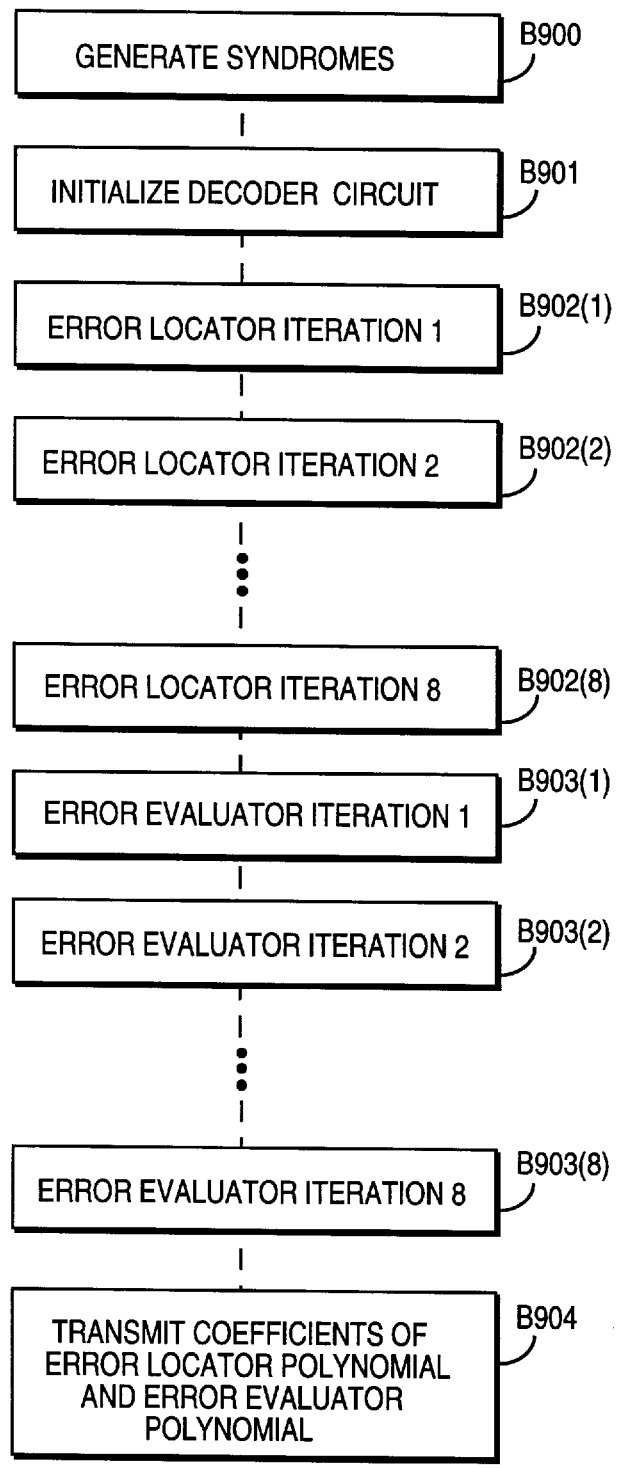
FIG. 19 is a flowchart showing general steps involved in error correction according to an embodiment of the invention.

FIG. 19 shows general steps involved in error correction of a codeword according to the present invention, beginning with generation of syndromes $S_0, S_1, \ldots S_7$ for a codeword at step B900 by syndrome generator 20 of FIG. 1. Step B901 involves initializing the decoder circuit B199. After initialization, decoding circuit performs a plurality of error locator iterations (steps B902(1) through B902(8)) followed by a plurality of error evaluator iterations (steps B903(1) through B903(8)). The number of iterations depends on the number of check symbols in the codeword and is illustrated as eight in the present embodiment.

The error locator iterations determines coefficients of the error locator polynomial σ(x) which are then stored in the error locator registers B101 of FIG. 13A and 13B. The error evaluator iterations obtain coefficients of the error evaluator polynomial ω(x) which are then stored in the intermediate registers (τ registers) B102 of FIG. 13A and 13B. After obtaining the final values of the coefficients, at step B904 the coefficients of the error locator polynomial σ(x) [in the error locator registers B101] are serially transmitted on lines SIG, and the coefficients of the error evaluator polynomial ω(x) [in the intermediate registers (τ registers) B102] are serially transmitted on lines TO, to root search and error/erasure magnitude generator 26 of FIG. 1.

As will be explained further herein, each error locator iteration comprises two phases or stages: a first phase (also called phase A), and a second phase (also called phase B). During phase A of each error locator iteration, the current discrepancy $d_n$ is generated and the coefficient values in the intermediate registers (τ registers) B102 are updated. During phase B of each error locator iteration, the coefficient values in the error locator registers (σ registers) B101 are updated and, at the end of phase B, the inverse of the discrepancy $d_{n-1}$ is available (which becomes known as the inverse of the prior discrepancy or $d_{n-1}^{-1}$ during the next error locator iteration).

The error locator iterations of the present invention include an implementation of the Berlekamp-Massey algorithm based on the following recursion rules:

update τ: $\tau^{(n)}(x) = x\tau^{(n-1)}(x)$ or $\tau^{(n)}(x) = x(\tau^{(n-1)}(x) + d_{n-1}^{-1}\sigma^{(n)}(x))$ (1)

calculate $d_n$: $d_n = \Sigma \sigma_k S_{n-k}$ update σ: $\sigma^{(n+1)}(x) = \sigma^{(n)}(x) - d_n\tau^{(n)}(x)$ (2)

During the first m clocks (e.g., phase A) of an error locator iteration, the τT(x) for the previous iteration is calculated, i.e. $\tau^{(n)}(x)$ is calculated, not $\tau^{(n+1)}(x)$. According to the present invention, the coefficients of the polynomials τ(x) and σ(x) need not be updated at the same time since they do not depend on each other, i.e. $\sigma^{(n+1)}(x)$ depends on $\tau^{(n)}(x)$ and $\tau^{(n)}(x)$ depends on $\sigma^{(n)}(x)$, not $\sigma^{(n-1)}(x)$. Therefore τ(x) can be updated using σ(x) and then σ(x) can be updated using the already updated τ(x). The final update for τ(x) is never done (which is acceptable since τ(x) is only useful for updating σ(x) and, moreover, once the final update for σ(x) is done the final update for τ(x) is not needed).

The recursion equation for β(x) can be written as:

$\tau^{(n+1)}(x) = x\tau^{(n)}(x)$ or $x\tau^{(n)}(x) + xd_n^{-1}\sigma^{(n+1)}(x)$.

To show that these equations are valid, the recursion equation for $\sigma^{(n+1)}(x)$ is substituted into the recursion equation for $\tau(x)^{(n+1)}$ to yield:

$\tau^{(n+1)}(x) = x\tau^{(n)}(x)$ or $x\tau^{(n)}(x) + xd_n^{-1}(\sigma^{(n)}(x) - d_n\tau^{(n)}(x)) = x\tau^{(n)}(x)$ or $xd_n^{-1}\sigma^{(n)}(x)$ which is identical to EQUATIONS 1.

During the first m clocks of an error locator iteration, the inverse of the discrepancy of the previous iteration (i.e., $d_{n-1}^{-1}$) is used. In accordance with an advantage of the present invention, a sequential method may be used for obtaining $d_{n-1}^{-1}$ instead of the usual $2^m \times m$ ROM. This sequential method is implemented by the discrepancy inversion circuit B212 of FIG. 12A and 12B, which is more fully described in U.S. Pat. No. 5,467,297 entitled "FINITE FIELD INVERSION" incorporated herein by reference.

In the update equation for $\tau^{(n)}(x)$, the first choice is taken when the order of $\sigma(x)$ is not changed and the second choice is taken when the order of $\sigma(x)$ is changed. If the signal CHANGE_L is used to indicate those iterations during which the order of $\sigma(x)$ is changed, then the recursion equations can be written according to EQUATIONS 3.

EQUATIONS 3 update $\tau$: $\tau^{(n)}(x) = x(\tau^{(n-1)}(x) + d_{n-1}^{-1}\sigma(x)*\text{CHANGE\_L})$ calculate $d_n$: (1)

$$d_n = \sum_{k=0}^{t-1} \sigma_k^{(n)} S_{n-k}$$

update $\sigma$: $\sigma^{(n+1)}(x) = \sigma^{(n)}(x) - d_n\tau^{(n)}(x)$ (2)

Decoder Operation: Syndrome Generation

The syndrome generation step B900 of FIG. 19 is conventional and understood by those skilled in the art. Assume the Reed-Solomon codeword generator polynomial is:

$$G(x) = \prod_{k=0}^{t-1} (x + \alpha^{L+k})$$

Then a data sequence $D(x)$ is coded into a codeword $C(x)$ in the following way: $C(x) = D(x)x^t - (D(x)x^t) \mod G(x)$. When a possibly corrupted codeword, $R(x) = C(x) + E(x)$, is received it is stored in buffer B194 and sent to the syndrome generator 20. At some later point, as determined by the asynchronous control of buffer B194, a byte-to-be corrected in the codeword $R(x)$ is sent to register B195 in FIG. 1. The syndromes are computed as:

$S_k = R(x) \mod (x + \alpha^{L+k})$ for $k = 0, 1, \ldots, t-1$.

The above equation is normally implemented using a linear feedback shift register (LFSR) within the syndrome generator 20.

Decoder Operation: Initialization

In initialization step B901 (see FIG. 19), syndrome values $S_0, S_1, \ldots S_7$ are loaded into the syndrome registers B103. In addition, the error locator registers B101, intermediate registers B102, and other values are initialized.

In the loading of syndrome values, syndrome $S_k$ is shifted into slice $B207_{t-k}$ for $k=1,2,\ldots,t-1$ and $S_0$ is shifted into slice B208A. Within each slice, shown in FIG. 13A for example, a syndrome is shifted into the S register B103 via MUX B104. Thus, initially syndrome $S_0$ is loaded into syndrome register B103 of slice B208A, while syndrome values $S_1, S_2, \ldots S_7$ are loaded into syndrome registers of slices $B207_7, B207_6, \ldots B207_1$, respectively. The syndrome values are serially loaded (one bit at a time) from syndrome generator 20 into the respective registers B103.

After the syndromes are initially shifted into the S registers B103, a forward shift of the syndromes is then performed wherein the contents of each S register B103 is serially shifted out (from the SFO output of each slice) to the SFI input of the next slice, and gated into the S register B103 of the next slice via MUX B104. In this initialization shift, the output of slice t (block B208A) feeds the input of slice $B207_1$, thereby forming a circular shift. During this circular shifting, the output of the S register B103 of each slice is also shifted into its paired SM register B100.

Error locator registers B101 and intermediate registers B102 of slice B208A slices $B207_1, B207_2, \ldots B207_7$ are reset to zero (by timer/controller B198) before the first phase of the first error locator iteration for the codeword.

Controller B213 (see FIG. 12A, for example) outputs the CHANGE_L signal to the CHG inputs of each slice. The CHANGE_L signal is initialized to "1" before starting the first iteration. The controller B213 also maintains two variables, LN and LM, which are initialized to 0 and 1 respectively. Also the DM register B210 is initialized to the alpha basis representation of $\alpha^0$ via MUX B211, which is the initial value for $d_{n-1}^{-1}$.

Decoder Operation: Discrepancy Generation

This brief discussion of generation of the current discrepancy $d_n$ is a prelude to a discussion of actual error locator iterations. Using the expression for $d_n$ from EQUATION 3

$$d_n = \sum_{k=0}^{t-1} \sigma_k^{(n)} S_{n-k}$$

it is seen that the discrepancy $d_n$ is derived from values in the locator coefficient registers B101 (i.e., the $\sigma$ registers) and the syndromes. Whereas the values stored in the locator coefficient registers B101 are in beta or second basis representation, the syndrome values are in the alpha or first basis representation. Accordingly, in order to multiply these two values together, one of the values must be repetitively multiplied by $\alpha$. In the illustrated embodiment, the syndromes are multiplied by $\alpha$ using the modified-syndrome multiplication circuit B105 as afore described.

The multiplication which yields the current discrepancy is partially accomplished using inner product circuit B107 (shown in more detail for one example field in FIG. 15). Inner product circuit B107 comprises part of a multiplier which forms part of a larger inner product (a term of the current discrepancy $d_n$). In particular, inner product circuit B107 (together with $\sigma$ register B101 and the modified-syndrome multiplication circuit B105) comprises a multiplier structure that produces, for each clock pulse, a serial output which is applied to adder B106.

Adder B106 sums the serial outputs of comparable multipliers of other slices to obtain an inner product of the syndromes with the current coefficients of the error locator polynomial. Thus, it should be understood that all slices are simultaneously conducting a multiplication and producing a one-bit output per clock cycle, which one-bit output is added (by adders B106) to the output of other slices to obtain a bit of the current discrepancy. Moreover, during the clock cycle in which a bit of the discrepancy $d_n$ is generated, that bit is transmitted to the discrepancy inversion circuit B212.

Decoder Operation: Error Locator Iteration, Phase A

As mentioned before, each error locator iteration includes both a first phase (also known as phase A) and a second phase (also known as phase B). During the first error locator iteration for each codeword, all slices $B207_1$–$B207_7$ and B208A have zero initialized in the error locator registers (i.e., σ registers) B101. Accordingly, slices B207$_1$–B207$_7$ contribute nothing to the discrepancy sum taking place during phase A of the first iteration. However, during the first error locator iteration, slice B208A (which has been initialized with syndrome S$_0$ and with α$^0$ as the other input to inner product circuit B107) will produce a non-zero output (basically, S$_0$α$^0$=S$_0$). Thus, during the first clock of phase A, inner product circuit B107 of slices B207 put out a bit of zero as their product. These bit zeros are added together by adders B106 to the non-zero output of slice B208A, which sum is bit 0 of the current discrepancy d$_n$. The thusly-obtained bit 0 of the current discrepancy d$_n$ is shifted during the same clock cycle to discrepancy inversion circuit B212 (see FIG. 14), which immediately begins its inversion.

During each clock cycle of the first error locator iteration, a further bit of the first term of the current discrepancy is obtained (from slice B208A exclusively during the first iteration) and applied to discrepancy in version circuit B212.

During phase A of the first iteration, the intermediate registers (i.e., τ registers) B102 have all been initialized to zero. During the first iteration, τ$_0$ (register B102 in slice B207$_1$) is initialized to α$^0$ by virtue of the fact that DM register B210 has been initialized to α$^0$ and CHANGE-L has been initialized to 1.

During error locator iterations other than the first iteration for a codeword, the values in the intermediate registers (τ registers) B102 are updated. The manner in which the update of τ registers B102 is updated depends on the result of the previous iteration (e.g. whether there was a length change as indicated by signal CHANGE_L).

Basically, in order to update the values in the intermediate registers (τ registers) B102 during phase A, decoder circuit B199 multiplies values in the error locator registers B101 (e.g., σ registers) by d$_{n-1}^{-1}$. This implements EQUATIONS 3, which state in part $$\tau^{(n)}(x)=x(\tau^{(n-1)}(x)+d_{n-1}^{-1}\sigma(x)*\text{CHANGE\_L})$$

The quantity d$_{n-1}^{-1}$ is initialized to α$^0$ in the DM register B210 for the first iteration, and thereafter is generated by discrepancy inversion circuit B212 and loaded into DM register B210 via MUX B211.

More specifically describing the update of the intermediate register B102, during phase A the contents of the error locator register B101 is transmitted via MUX B111 to a first port of inner product circuit B110. The second input port of inner product register is connected by line M to DM register B210 to receive an α-multiple of d$_{n-1}^{-1}$. The output of inner product circuit B110 is applied to AND gate B109 and (if required by signal CHANGE_L) is added (by adder B108) to the contents of the intermediate register B102 (i.e., τ register) for application on line TO to the τ register B102 of the rightwardly neighboring slice. If signal CHANGE_L does not require, the contents of the intermediate register B102 (i.e., τ register) are directly applied on line TO to the τ register B102 of the rightwardly neighboring slice without addition of the output of inner product circuit B110. Thus, it requires all clocks of phase A in order to update the intermediate registers B102 (i.e., τ register) of all slices.

The values in the error locator registers (e.g., σ registers) B101 do not change during the first phase of an error locator iteration. However, the value in register SM B100 (initially loaded with the syndrome) is being clocked with α feedback during each clock cycle. The original syndrome value remains in register B103 during the first phase of each iteration.

At the end of phase A, all 8 bits of the current discrepancy have been shifted (in second or beta basis representation) into discrepancy inversion circuit B212; have been converted into first or α basis representation (by conversion circuit B214); and, have been muxed into DM register B210 for use during phase B. However, at the end of phase A, discrepancy inversion circuit B212 still needs another eight clock cycles (e.g., the duration of phase B) in order to generate the inverse of d$_n$.

Phase A execution of decoding circuit B199 differs from iteration to iteration primarily by the fact that registers B103 (and hence registers B100) and a registers B101 have been loaded/updated with different values. As explained below, during phase B syndrome values are circularly shifted and τ register values are updated. Hence, during a second error locator iteration for a codeword, two slices (e.g, slices B208A and slice B207$_1$) will be operative in yielding current discrepancy d$_n$. Similarly, with respect to discrepancy generation, three slices will be operative during a third iteration, four slices during a forth iteration, and so on until all slices are operative during the eight (last) error locator iteration. At the end of each phase A execution, decoder circuit B199 has generated d$_n$; has shifted dn into discrepancy inversion circuit B212; and, has updated intermediate registers B102 (i.e., τ register) of all slices.

Decoder Operation: Error Locator Iteration, Phase B

Phase B also has, in the illustrated embodiment, eight clock cycles. Three major actions occur during phase B: the syndromes are serially shifted to an adjacent slice; generation of the inverse of d$_n$ (which will be known as d$_{n-1}^{-1}$ during the next error locator iteration) is completed; and, values in the error locator registers (σ registers B101) are updated using the values in the intermediate registers B102 and the value of d$_n$ which was just generated during phase A.

During phase B of each error locator iteration, decoder circuit B199 serially shifts the syndrome values in preparation for the next phase A so that a new d$_n$ can be generated during the next phase A. In this respect, a forward shift of the syndromes is performed wherein the contents of each S register B103 is shifted out the slice SFO output to the SFI input of the next slice and into the S register B103 of the next slice (via MUX B104). The output of slice B208A feeds the input of slice B207$_1$ forming a circular shift. During this shifting, the transmitting slice also shifts the outgoing syndrome value into its SM register B100.

At the beginning of phase B, DM register B210 contains not d$_{n-1}^{-1}$ but d$_n$ of the current iteration (which was just determined during phase A). The value d$_n$ in DM register B210 has been converted (by conversion circuit B214) to alpha representation, which is necessary for conducting an inner product operation with respect to the contents of the intermediate registers B102 (τ registers) which are in β basis representation. After the first clock cycle of phase B, the value of d$_n$ is multiplied by α so that the contents of DM register becomes an α-multiple of d$_n$ for use in phase B.

During phase A, the intermediate registers B102 (i.e., τ registers) were updated by shifted values while the error locator registers (e.g., σ registers) B101 stayed fixed. During phase B, on the other hand, the error locator registers (e.g., σ registers) 101 are updated while the intermediate registers B102 (i.e., τ registers) remain fixed. In fact, it is the intermediate registers B102 (i.e., τ registers) that are used to update the values of the coefficients of the error locator polynomial stored in the error locator registers B102.

During phase B, the coefficients of the error locator polynomial are updated according to EQUATIONS 3

$$\sigma^{(n+1)}(x) = \sigma^{(n)}(x) - d_n \tau^{(n)}(x)$$

The contents of the intermediate registers B102 (i.e., τ registers) are applied through MUX B111 to the first input port of inner product circuit B110. Inner product circuit B110 forms an inner product with the contents of the τ register and $d_n$ (dn having been applied on line M). The output of inner product circuit B110 is a serial bit (one bit per clock of phase B), which is added by single bit adder B112 to the serially shifted-out contents of error locator register (e.g., σ register) B101. Thus, it takes eight clock cycles to update the contents of the error locator register (e.g., σ register) B101 for each slice. The updating operation just-described for error locator register (e.g., σ register) B101 of one slice simultaneously occurs for all slices (there being, of course, differing values in the σ registers B101 of differing slices).

Thus, when phase A of the next error locator iteration begins, the phase A operations will be executed with the new values in the σ registers B101 as updated during the previous phase B. Also, at the end of phase B, discrepancy inversion circuit B212 has completed the inversion of $d_n$, which is available at the INV outputs and applied via MUX B211 into DM register B210 for use as $d_{n-1}^{-1}$ during phase A of the next error locator iteration.

At the end of phase B of the last (eighth) error locator iteration, the final values of the coefficients of the error locator polynomial for the codeword are stored in the σ registers B101.

Decoder Operation: Error Evaluator Iteration

After completion of the last error locator iteration for a codeword (e.g., after step B902(8) of FIG. 19, the final values of the coefficients of the error locator polynomial for the codeword are stored in the σ registers B101. Yet remaining is the generation of coefficients for the error evaluator polynomial. Advantageously, using another eight iterations (distinctly known as error evaluator iterations) as depicted by steps B903(1)–B903(8) of FIG. 19, decoder circuit B199 generates the error evaluator coefficients and stores those coefficients in the intermediate registers B102 (τ registers).

The final values of the coefficients of the error locator polynomial for the codeword are used to generate the error evaluator polynomial ω(x). The coefficients of the error evaluator polynomial ω(x) are defined as:

$$\omega_k = \sum_{j=0}^{k} \sigma_j S_{k-j}$$

for k=0,1, . . . , t−1. Because the form of the error evaluator polynomial ω(x) is the same as that for calculating $d_n$, the decoding circuit B199 can find coefficients for both polynomials. The coefficients are generated in t double phase iterations (assuming t errors to correct).

The error evaluator iterations are similar to phase A of the error locator iterations with the following modifications:

(1) During phase A of the last error locator algorithm iteration (e.g., step B902(8) of FIG. 19), the syndrome registers B103 in each slice are backward shifted, i.e. the contents of the S registers B103 are shifted out SBO output and into the SBI input of the preceding slice and into the S register B103 of the previous slice via MUX B104. A signal G from controller B213 is set to "1" during this backward shift of syndromes.

(2) During phase B of the last error locator iteration (e.g., step B902(8) of FIG. 19), the S registers B103 in each slice are again backward shifted and at the same time the output of the S register B103 in each slice is shifted into the SM register B100. During this and all subsequent backward shifts the signal G output from controller B213 is set to "0". Setting signal G in this manner forces "0"s into the SBI input of slice t−1 by AND gate B216.

(3) During phase A of each error evaluator iteration (also known as an iteration), the DNO output of slice t is $\omega_k$ where k is t−1 for the first ω iteration, t−2 for the second, etc., and 0 for the last ω iteration, $\omega_k$ is shifted into the TI input of slice 1 via MUX B215.

(4) During phase B of each ω iteration, the S registers B104 are backward shifted and also shifted into the SM registers B100. The σ registers B101 do not shift.

(5) The value of CHANGE_L is fixed at "0" as shown in FIG. 17. This allows all of the t registers to function as a single shift register so that after the t iterations the τ register in slice k contains $\omega_{k-1}$.

For example, after completion of the 8 clocks of a first error evaluator iteration, the eight bits of $\omega_7$ are loaded into τ register B102 of slice B207$_1$. After completion of a second error evaluator iteration, the eight bits of $\omega_6$ are loaded into τ register B102 of slice B207$_1$ and $\omega_7$ is transferred into τ register B102 of slice B207$_2$. Similar processing continues for all eight error evaluator iterations until all coefficients $\omega_0$–$\omega_7$ are stored in slices B207$_1$–B208A, respectively.

During the error evaluator iterations, the previouslydetermined final σ coefficients remain undisturbed in σ registers B101.

After the t iterations the σ and t registers are then shifted m more times so that the error locator and error evaluator polynomials can be transferred to root search and error/erasure magnitude generator 26 (see FIG. 1).

Decoder Operation: Coefficient Transfer

After completion of all error locator iterations and all error evaluator iterations, and as reflected by step B904 of FIG. 19, decoder circuit B199 transfers the final values for the coefficients of the error locator polynomial (stored in the σ registers B101) and the final values for the coefficients of the error evaluator polynomial (stored in the τ registers B102) to root search and error/erasure magnitude generator 26. Each slice of decoder circuit B199 has one coefficient in its σ register B101 and one ω coefficient in its τ register B102. Transfer from the σ register B101 and the τ register B102 occur (on lines SIG and TO, respectively) at a rate of one bit per clock (serial transfer), with serial transfers from both registers B101 and B102 occurring simultaneously. Thus, root search and error/erasure magnitude generator 26 receives simultaneously one bit of a σ coefficient from each slice and one bit of an ω coefficient from each slice.

Root search and error/erasure magnitude generator 26 supplies error patterns to adder B202 to correct data as it is retrieved from register B195. Error locations are found with a root search for σ(x), i.e. byte k is in error whenever σ($\alpha^{-k}$)=0. The error magnitude is then calculated as:

$$E_k = \frac{\alpha^{-k(L-1)} \omega(\alpha^{-k})}{\sigma'(\alpha^{-k})}$$

where ' represents the first derivative of σ.

Decoder Operation: Erasures

Erasure pointers decrease the complexity of the Reed-Solomon decoder by decreasing the redundancy needed to correct t errors. Without erasure pointers, the Reed-Solomon decoder requires 2t redundancy symbols to correct t data symbols. For every correct erasure pointer, however, the number of necessary redundancy symbols decreases by one.

If the received sequence R(x) contains v erasures, then the erasure pointers are input during the first v error locator iterations which are modified in the following way:

(1) At the end of each phase A of the first v iterations, instead of loading $d_n$ into DM register B210, an erasure value in the form of $\alpha$ raised to the $e_k$ power is loaded into DM register B210 via MUX B211 (see FIG. 12A). In this nomenclature, $e_k$ is the location of the $k^{th}$ erasure, i.e., the $e_k^{th}$ coefficient of R(x).

(2) At the end of each phase B of the first v iterations, instead of loading $d_{n-1}$ into DM B210, $\alpha^0$ is loaded into DM register B210 via MUX B211.

(3) The signal CHANGE_L is fixed at "1" and at the end of each phase A, LN gets LM and LM gets LM+1. This is illustrated in FIG. 17.

Slice t, detailed in FIG. 13B, does not contain adder B112, since the only time that $\sigma_t$ is generated is when there are t erasures and no errors (in which case all iterations will be erasure iterations and the only time that the $\sigma$ register in slice t will receive a non-zero value will be on the last iteration).

Figure 20:
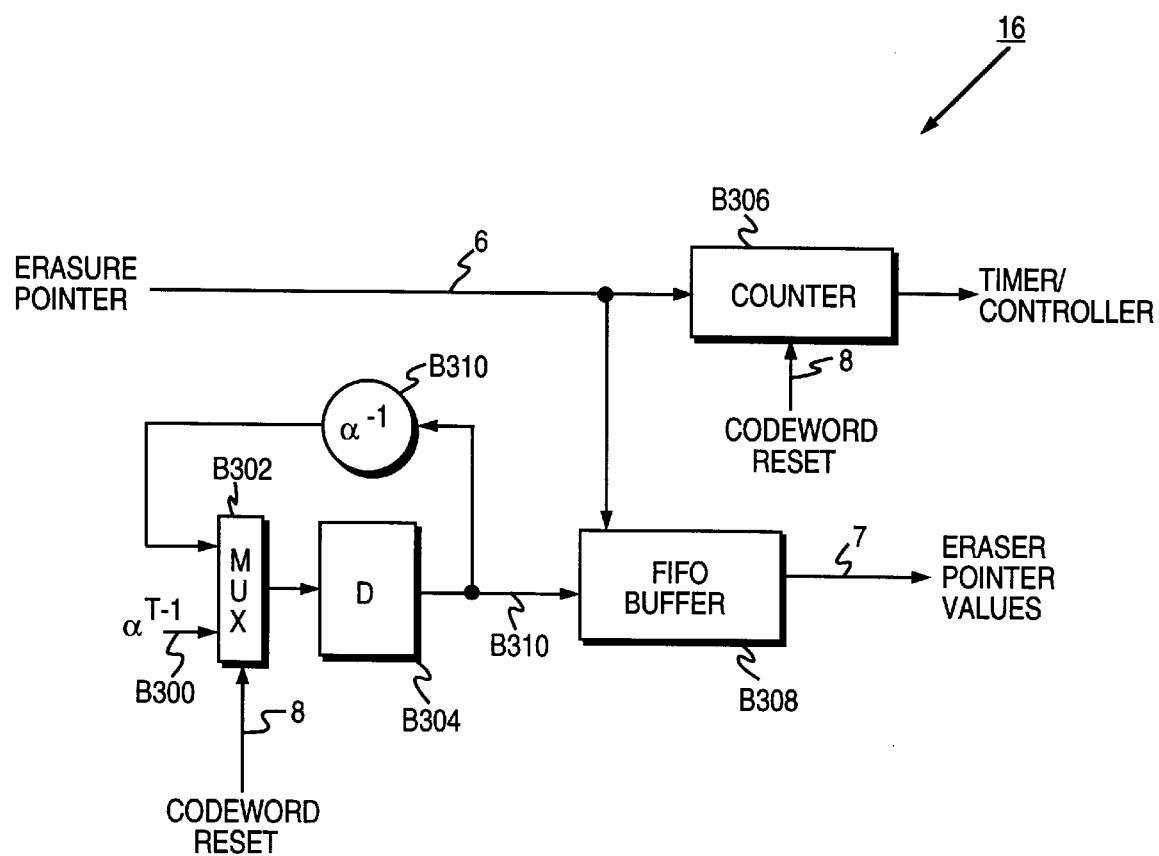
FIG. 20 shows details of an erasure pointer value generator of FIG. 1.

FIG. 20 illustrates a circuit for generating the erasure values $\alpha$ raised to the $e_k$ power. At the beginning of a new codeword detected by the read channel, the codeword reset line 8 selects $\alpha^{T-1}$ B300 as the output of multiplexor B302 and loads it into a register B304, where T is the number of symbols in a codeword. The codeword reset line 8 also resets a counter B306 which counts the number of erasure pointers input over line 6 for the new codeword. At each clock, if an erasure pointer is input over line 6, it loads the corresponding error value (i.e., $\alpha$ raised to the $e_k$ power) into a FIFO buffer B308 over line B310 and increments counter B306. Also at each clock, the output of the register B304 is multiplied by $\alpha^{-1}$ B310 and the product is restored to the register B304 through multiplexor B302. In this manner, the output B310 of the register B304 corresponds to the error value (i.e., $\alpha$ raised to the $e_k$ power) for the current erasure pointer location in the codeword.

When the decoder 22 of FIG. 1 is ready to start processing the syndromes of the new codeword, the number of erasure pointers generated for that codeword are transferred from counter B306 to the Timer/Controller 18. Then, during the first v iterations (where v is the number of erasure pointers), the Timer/Controller 18 loads the erasure pointers from the FIFO buffer B308 into the decoder 22, and the first v error locator iterations are executed according to the steps outlined above.

Deocoder Operation: Errors Only Decoding

FIG. 12B shows an error correction system of the invention which (unlike the system of FIG. 12A) does not incorporate erasure correction. Since at most t/2 errors may be corrected, only t/2 Berlekamp-Massey algorithm slices are needed. Thus, in the embodiment of FIG. 12B slices (t/2)+1 to t−1 are replaced with the collective modified slice circuit B217, detailed in FIG. 13C. The slices of circuit B217 contain only an S register B103 and associated MUX B104. Slice t of the system of 12B is replaced with a modified slice B208B which is detailed in FIG. 13D. Slice B208B of FIG. 13D which contains only S register B103 (with associated MUX B104); modified-syndrome multiplication circuit B105; and inner product circuit B107. During initialization of the system of FIG. 12B, the S register B103 in slice k is loaded with $S_{t-k}$, as before, with k=1,2, . . . ,t/2. $S_0$ is loaded into slice B208B, as before, and the remaining syndromes are loaded into the S registers B103 contained in circuit B217. There are t iterations for generating $\sigma(x)$ and then t/2 iterations for generating $\omega(x)$. The $\omega(x)$ calculated by this system has coefficients:

$$\omega_k = \sum_{j=0}^{k} \sigma_j S_{k-j+\frac{t}{2}}$$

for k=0, 1, . . . , t/2−1.

The t/2 coefficients of $\sigma(x)$ and the t/2 coefficients of $\omega(x)$ are then transferred into root search and error/erasure magnitude generator 26 to correct errors. A root search is performed as before and then the error magnitude is then calculated as:

$$E_k = \frac{\alpha^{-k(L-1+\frac{t}{2})}\omega(\alpha^{-k})}{\sigma'(\alpha^{-k})}$$

Alternative Sync Detection Embodiments

The preferred embodiment of the present invention for achieving byte synchronization has been described above as a data sync detector 100, sync buffer 96, and a sync controller 106 implemented within a sampled amplitude read channel as shown in FIG. 2. However, other alternative embodiments have been contemplated and are within the intended scope of the present invention.

One such alternative embodiment is to implement the sync buffer 96, sync controller 106, and RLL decoder 94 in the ECC system of FIG. 1. In this manner, when the data sync detector 100 of FIG. 2 is enabled to begin searching for the primary sync mark, the estimated data sequence 92 is transmitted to the data buffer 10 of FIG. 1. That is, the estimated data sequence 92 transmitted to the data buffer 10 includes part of the primary preamble and sync mark. When the data sync detector 100 detects the primary or secondary sync mark, it generates a sync detect signal to the timer/controller 18 of FIG. 1. The timer/controller 18 configures the data sync detector 100 to detect the primary or secondary sync mark at the appropriate times.

If the primary sync mark is undetectable, the timer/controller 18 "times out" and configures the sync mark detector 100 to detect the secondary sync mark. When the secondary sync mark is detected, the timer/controller retroactively byte synchronizes the sector data stored in the data buffer 10. Once byte synchronized, the sector data is RLL decoded and transferred from the data buffer 10 to the redundancy/syndrome generator 20 to generate the error syndromes for correcting errors in the sector data. Similarly, if frequency or phase lock is lost while reading a data sector, the timer/controller 18 performs the resynchronization operations described above with reference to FIG. 8A and 8B on the user data stored in the data buffer 10.

In yet another alternative embodiment, a sync buffer 96 for buffering the estimated data sequence 92 as well as retroactive resynchronization are not implemented. Only erasure pointers are generated by the read channel sync controller 106 for correcting errors associated with an undetectable sync mark or loss of byte synchronization. When the sync controller 106 times out because the primary sync mark is undetectable, it activates the RLL decoder so that a sequence of decoded "pad symbols" are transmitted to the ECC system as place holders for the user data inbetween the primary and secondary sync marks. Then when the secondary sync mark is detected, the RLL decoder transmits valid synchronized symbols for the remainder of the sector, and the sync controller 106 generates erasure pointers 6 to assist correcting the transmitted pad symbols. If the secondary sync mark is also undetectable, then the sync controller 106 transmits an error signal (e.g., RLL data symbols that ensures uncorrectability) to prevent the ECC system from miscorrecting the data sector and passing invalid data to the host system. This embodiment may be preferred to avoid the complexity and cost of the sync buffer 96, and to avoid modifying the operation of a conventional ECC system of FIG. 1. That is, this embodiment provides at least some protection against the inability to synchronize to a primary sync mark without significant modifications to storage systems already in use.

In yet another embodiment which is only a slight modification to the one just described, "pad symbols" are not transmitted when the primary sync mark is undetectable. Instead, the ECC system of FIG. 1 is provided a signal indicating that the primary sync mark was "missed" and to begin storing the received data (detected and decoded after the secondary sync mark) in the appropriate location in the data buffer 10. That is, the timer/controller 18 adjusts an input pointer of the data buffer 10 so that the received data is stored at an offset to account for the symbols preceding the secondary sync mark that are not transmitted (i.e., to create "pad symbols"). Again, erasure pointers are generated to correct the data symbols inbetween the primary and secondary sync marks. Further, the linear feedback shift register (LFSR) of the redundancy/syndrome generator 20 is initialized to zero to avoid having to account for the untransmitted data in generating the error syndromes. That is, the untransmitted pad symbols can be treated as if they were zero and would therefore not contribute to the syndrome calculation. In this manner, the redundancy/syndrome generator 20 operates only on the received data symbols transmitted after the secondary sync mark has been detected. Again, the advantage to this embodiment is that it requires only minor modifications to a conventional ECC system already in use.

Error Management

Another aspect of the present invention is to exploit the use of multiple sync marks to improve error management functions such as in-the-field defect mapping of a sector with an undetectable primary or secondary sync mark. Referring again to FIG. 2, the sync controller 106 keeps track of a "sync status" variable which indicates which sync mark within a data sector that byte synchronization was achieved. If the primary sync mark is corrupted and undetectable, a decision may be made to defect map that sector. That is, to map the data sector comprising undetectable primary or secondary sync marks to a spare sector on the disk.

To this end, the present invention also comprises a means for logging an identification number of a data sector for defect mapping. When a data sector exceeds a predetermined threshold of error tolerance (e.g., exceeds a number of undetectable sync marks or a number of locations where frequency or phase lock is lost within the sector), then that sector's number is stored in a log to facilitate mapping to a spare sector during idle time of the storage system.

Yet another related aspect of the present invention is the ability to disable one or more of the sync marks to test the detectability of other sync marks. For instance, the sync controller 106 of FIG. 2 may intentionally disable detection of the primary sync mark in order to test the detectability of the secondary sync marks. If too many secondary sync marks are undetectable, the sector may be mapped to a spare sector.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

We claim:

1. An apparatus for reading data recorded on a magnetic disk storage medium, wherein the disk storage medium comprises a plurality of concentric data tracks; each data track comprises one or more data sectors; and at least one data sector comprises a data field, a primary sync mark located at the beginning of the data field for initial synchronization, and at least one secondary sync mark located a predetermined number of datum after the primary sync mark within the data field for synchronizing to the data field; the apparatus comprising:

(a) an input connected to receive a sequence of detected datum representing a data sector recorded on the magnetic disk storage medium;

(b) a sync mark detector, responsive to the sequence of detected datum, for detecting the primary sync mark, wherein when the primary sync mark is undetectable due to errors in the sequence of detected datum, the sync mark detector detects the secondary sync mark; and (c) a sync controller for synchronizing a first section of the data field following the primary sync mark using the primary sync mark, and for retroactively synchronizing a second section of the data field preceding the secondary sync mark using the secondary sync mark.

2. The apparatus as recited in claim 1, wherein the predetermined number of datum between the primary and secondary sync marks is programmable.

3. The apparatus as recited in claim 1, wherein:

(a) each sync mark comprise a pattern of expected datum; and (b) the pattern of the primary sync mark is the same as the pattern of the secondary sync mark.

4. The apparatus as recited in claim 1, wherein:

(a) each sync mark comprise a pattern of expected datum; and (b) the pattern of the primary sync mark is not the same as the pattern of the secondary sync mark.

5. The apparatus as recited in claim 1, wherein at least one of the sync marks is error tolerant.

6. The apparatus as recited in claim 5, wherein the primary sync mark is more error tolerant than the secondary sync mark.

7. The apparatus as recited in claim 1, further comprising:

(a) a data buffer for storing the detected datum as it is received; and (b) a controller for controlling the buffer location to store the detected datum, wherein the buffer location is adjusted when the primary sync mark is undetectable to account for the predetermined number of datum between the primary and secondary sync marks.

8. The apparatus as recited in claim 1, further comprising:

(a) a data buffer for storing the detected datum as it is received; and (b) an error detection and correction system for detecting and correcting errors in the detected datum, including errors in the predetermined number of datum between the primary and secondary sync marks when the primary sync mark is undetectable.

9. The apparatus as recited in claim 8, wherein:

(a) the error correction system comprises a residue generator for generating residues when reading a data sector from the magnetic disk; and (b) the residue generator is initialized to zero to avoid accounting for the predetermined number of datum between the primary and secondary sync marks when the primary sync mark is undetectable.

10. The apparatus as recited in claim 8, wherein:

(a) the error correction system comprises an erasure pointer processor for processing erasure pointers to symbol locations within the data field; and (b) the erasure pointer processor processes erasure pointers corresponding to at least one of the predetermined number of datum between the primary and secondary sync marks when the primary sync mark is undetectable.

11. The apparatus as recited in claim 10, wherein the error detection and correction, including the erasure pointer processing, occurs on-the-fly.

12. The apparatus as recited in claim 1, further comprising a synchronization buffer for storing the detected datum as it is received, wherein:

(a) one or more of the predetermined number of datum between the primary and secondary sync marks are stored in the synchronization buffer; and (b) when the primary sync mark is undetectable, the sync mark detector detects the secondary sync mark for synchronizing to the detected datum stored in the synchronization buffer.

13. The apparatus as recited in claim 12, further comprising:

(a) a data buffer for storing the detected datum as it is received; and (b) an error detection and correction system for detecting and correcting errors in the detected datum, including errors in the predetermined number of datum between the primary and secondary sync marks when the primary sync mark is undetectable, wherein:

(i) the error correction system comprises an erasure pointer processor for processing erasure pointers to symbol locations within the data field; and (ii) the erasure pointer processor processes erasure pointers corresponding to at least one of the predetermined number of datum between the primary and secondary sync marks when the primary sync mark is undetectable.

14. The apparatus as recited in claim 13, wherein the number of erasure pointers generated is programmable.

15. The apparatus as recited in claim 1, wherein:

(a) an acquisition preamble is located before the primary sync mark for initially acquiring frequency and phase lock before reading the primary sync mark; and (b) an acquisition preamble is located before the secondary sync mark for acquiring frequency and phase lock when the initial acquisition is unsuccessful.

16. The apparatus as recited in claim 1, wherein an acquisition preamble is located before the primary sync mark and an acquisition preamble is not located before the secondary sync mark.

17. The apparatus as recited in claim 1, wherein:

(a) an acquisition preamble is located before the primary sync mark for acquiring frequency and phase lock before reading the primary sync mark; and (b) a training sequence is located before the data field for training an adaptive equalizer filter before reading the data field.

18. The apparatus as recited in claim 1, further comprising a sync status for indicating which sync mark synchronization was achieved.

19. The apparatus as recited in claim 1, further comprising a means for disabling the primary sync mark in order to test the ability to detect the secondary sync mark.

20. The apparatus as recited in claim 1, wherein the secondary sync mark is for resynchronization when initial synchronization is lost.

21. The apparatus as recited in claim 20, further comprising:

(a) a data buffer for storing the detected datum as it is received; and (b) an error detection and correction system for detecting and correcting errors in the detected datum, including errors in the predetermined number of datum between sync marks when initial synchronization is lost, wherein:

(i) the error correction system comprises an erasure pointer processor for processing erasure pointers to symbol locations within the data field; and (ii) the erasure pointer processor processes erasure pointers corresponding to datum between sync marks where initial synchronization was lost.

22. The apparatus as recited in claim 1, wherein the length of the first and second section are programmable.

23. An apparatus for reading data recorded on a magnetic disk storage medium, wherein the disk storage medium comprises a plurality of concentric data tracks; each data track comprises one or more data sectors; and at least one data sector comprises a data field, a primary sync mark preceding the data field and at least one secondary sync mark embedded within the data field for synchronizing to the data field; the apparatus comprising:

(a) a sampling device for sampling an analog read signal emanating from a read head positioned over the magnetic medium and generating a sequence of discrete time sample values;

(b) timing recovery for extracting timing information from the sequence of sample values;

(c) a discrete time sequence detector for detecting a bit sequence from the sequence of sample values;

(d) a sync mark detector, responsive to the sequence of discrete time sample values, for detecting the primary sync mark, wherein when the primary sync mark is undetectable due to errors, the sync mark detector detects the secondary sync mark;

(e) a sync buffer for storing the detected datum as it is received; and (f) a sync controller for synchronizing a first section of the data field following the primary sync mark using the primary sync mark, and for retroactively synchronizing a second section of the data field preceding the secondary sync mark using the secondary sync mark.

24. The apparatus as recited in claim 23, wherein the secondary sync mark is located a predetermined number of datum from the beginning of the data field.

25. The apparatus as recited in claim 24, further comprising an erasure pointer generator for generating erasure pointers to symbol locations within the data field corresponding to the predetermined number of datum between the beginning of the data field and the secondary sync mark when the primary sync mark is undetectable due to errors.

26. The apparatus as recited in claim 24, further comprising a synchronization buffer for buffering the detected bit sequence corresponding to at least part of the predetermined number of datum between the beginning of the data field and the secondary sync mark, wherein when the primary sync mark is undetectable, the sync mark detector detects the secondary sync mark for synchronizing to at least part of the predetermined number of datum stored in the synchronization buffer.

27. The apparatus as recited in claim 24, further comprising an RLL decoder for decoding the detected bit sequence, wherein:

(a) the sync mark detector synchronizes the RLL decoder to codeword boundaries; and (b) when the primary sync mark is undetectable, the RLL decoder outputs placeholder data to account for the predetermined number of datum between the beginning of the data field and the secondary sync mark.

28. The apparatus as recited in claim 27, wherein the RLL decoder outputs predetermined invalid data when the secondary sync mark is undetectable to prevent miscorrection by an error detection and correction system.

29. The apparatus as recited in claim 23, further comprising a thermal asperity detector for detecting a thermal asperity condition in the sequence of sample values.

30. The apparatus as recited in claim 23, wherein timing recovery comprises a register for storing a default value for initializing timing recovery when timing synchronization is lost.

31. The apparatus as recited in claim 23, wherein when timing synchronization is lost, timing recovery re-establishes phase lock over user data.

32. The apparatus as recited in claim 23, wherein the length of the first and second section are programmable.

33. The apparatus as recited in claim 23, further comprising:

(a) a data buffer for storing the detected datum as it is received; and (b) an error detection and correction system for detecting and correcting errors in the detected datum, including errors in the predetermined number of datum between sync marks when timing synchronization is lost, wherein:

(i) the error correction system comprises an erasure pointer processor for processing erasure pointers to symbol locations within the data field; and (ii) the erasure pointer processor processes erasure pointers corresponding to datum between sync marks where timing synchronization was lost.

34. An apparatus for reading data recorded on a magnetic disk storage medium, wherein the disk storage medium comprises a plurality of concentric data tracks; each data track comprises one or more data sectors; and at least one data sector comprises a data field, a primary sync mark preceding the data field and at least one secondary sync mark embedded within the data field for synchronizing to the data field; the apparatus comprising:

(a) a sampling device for sampling an analog read signal emanating from a read head positioned over the magnetic medium and generating a sequence of discrete time sample values;

(b) timing recovery for extracting timing information from the sequence of sample values;

(c) a discrete time sequence detector for detecting a bit sequence from the sequence of sample values;

(d) a sync mark detector, responsive to the sequence of discrete time sample values, for detecting the primary sync mark, wherein when the primary sync mark is undetectable due to errors, the sync mark detector detects the secondary sync mark;

(e) an input connected to receive the analog read signal;

(f) a frequency synthesizer for generating a periodic waveform;

(g) a multiplexor for multiplexing the analog read signal and the periodic waveform into the sampling device, wherein:

(i) the periodic waveform is selected as the input into the sampling device before reading a data sector in order to frequency lock timing recovery; and (ii) the analog read signal is selected as the input into the sampling device after frequency locking timing recovery in order to read an acquisition preamble and the data field; and (iii) when frequency lock is lost while reading the data field, then:

the periodic signal is selected as the input into the sampling device to re-establish frequency lock;

when frequency lock is re-established, the analog receive signal is again selected as the input to the sampling device in order to re-establish phase lock over the data field; and when phase lock is re-established, a secondary sync mark is detected to re-establish byte synchronization over the data field.

* * * * *